May 18, 1954   L. G. POLLARD ET AL   2,678,589
AUTOMATIC MESSAGE SEALING MACHINE
Filed March 22, 1951   17 Sheets-Sheet 1

INVENTORS
L. G. POLLARD
G. H. RIDGE
G. JOHANSON
BY
ATTORNEY

May 18, 1954

L. G. POLLARD ET AL 2,678,589

AUTOMATIC MESSAGE SEALING MACHINE

Filed March 22, 1951

INVENTORS
L. G. POLLARD
G. H. RIDGE
G. JOHANSON

BY

ATTORNEY

May 18, 1954  L. G. POLLARD ET AL  2,678,589
AUTOMATIC MESSAGE SEALING MACHINE
Filed March 22, 1951  17 Sheets-Sheet 3

INVENTORS
L. G. POLLARD
G. H. RIDGE
G. JOHANSON
BY
ATTORNEY

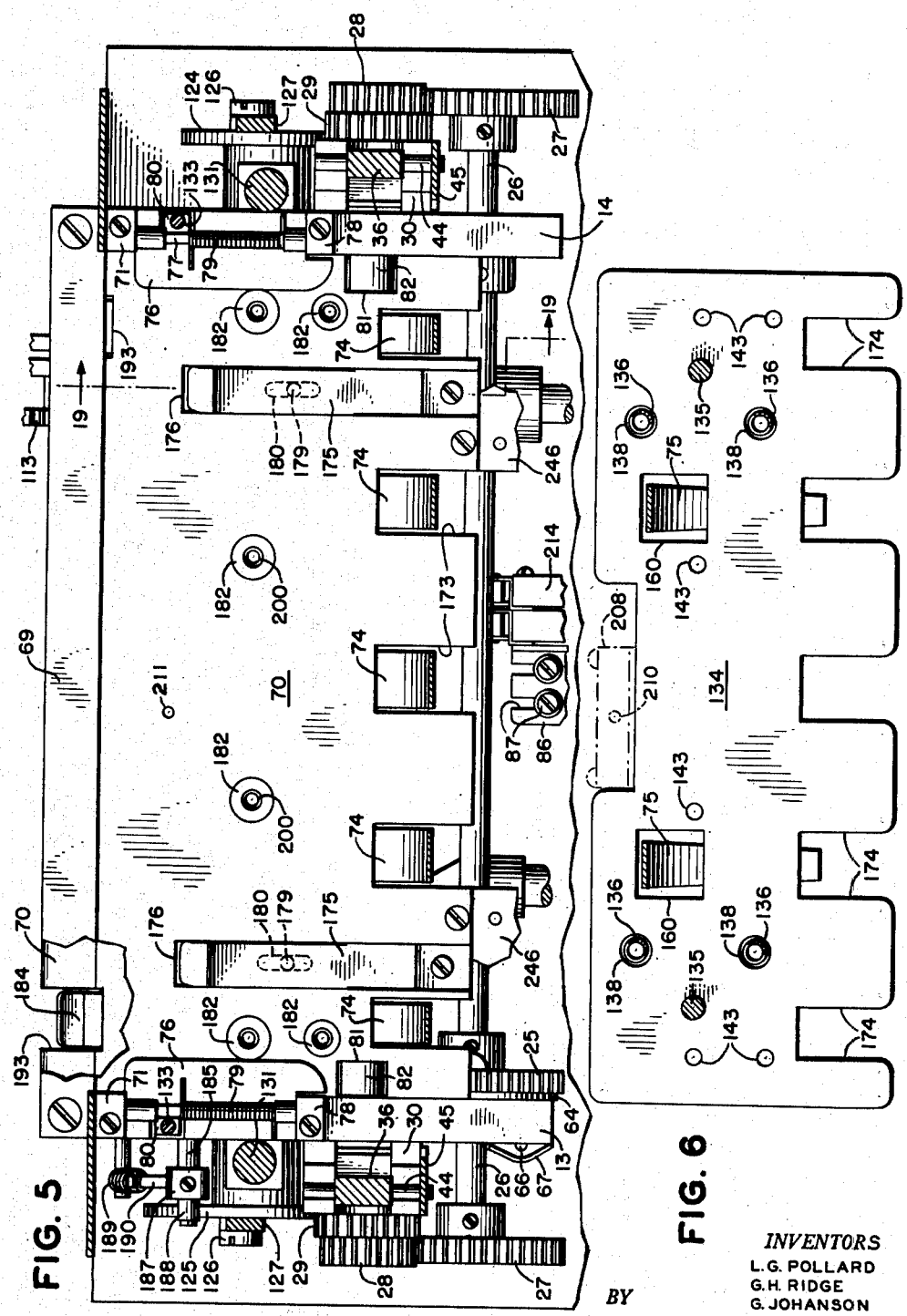

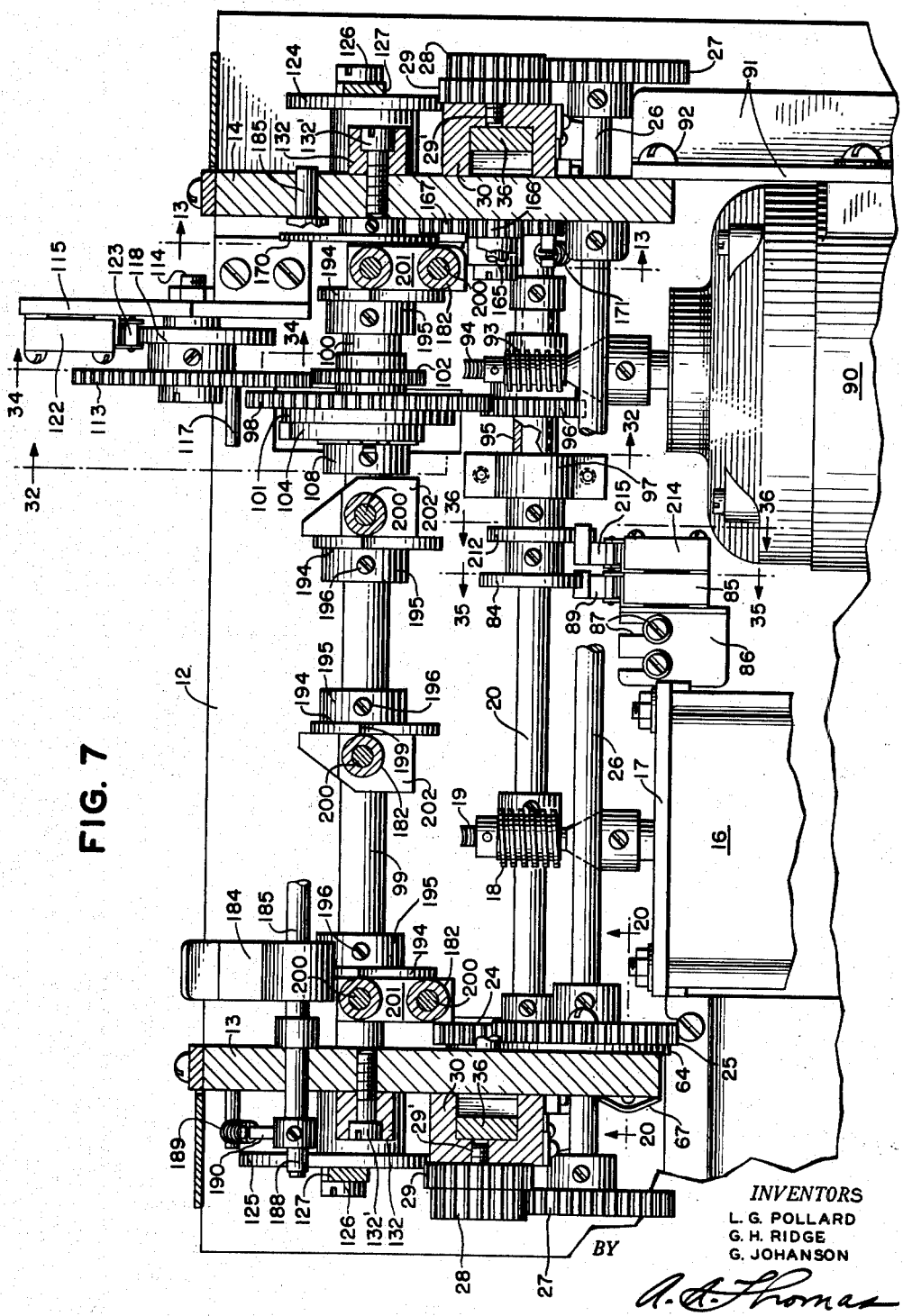

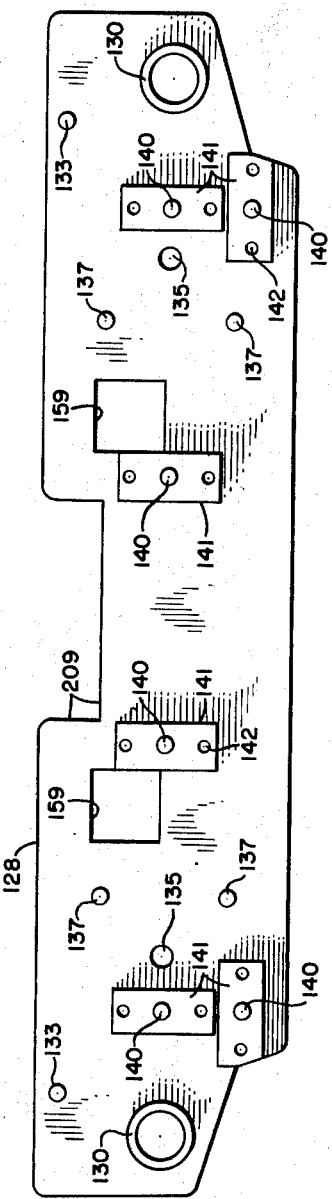

May 18, 1954  L. G. POLLARD ET AL  2,678,589
AUTOMATIC MESSAGE SEALING MACHINE
Filed March 22, 1951  17 Sheets-Sheet 8

INVENTORS
L. G. POLLARD
G. H. RIDGE
G. JOHANSON
BY
ATTORNEY

INVENTORS
L. G. POLLARD
G. H. RIDGE
G. JOHANSON
BY
ATTORNEY

INVENTORS
L. G. POLLARD
G. H. RIDGE
G. JOHANSON
BY
*A. B. Thomas*
ATTORNEY

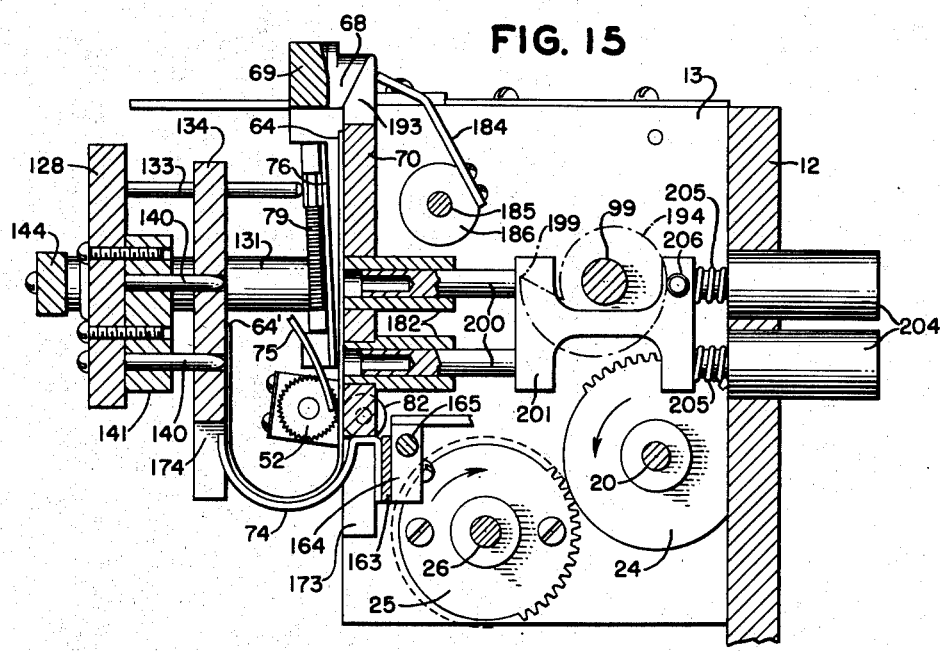
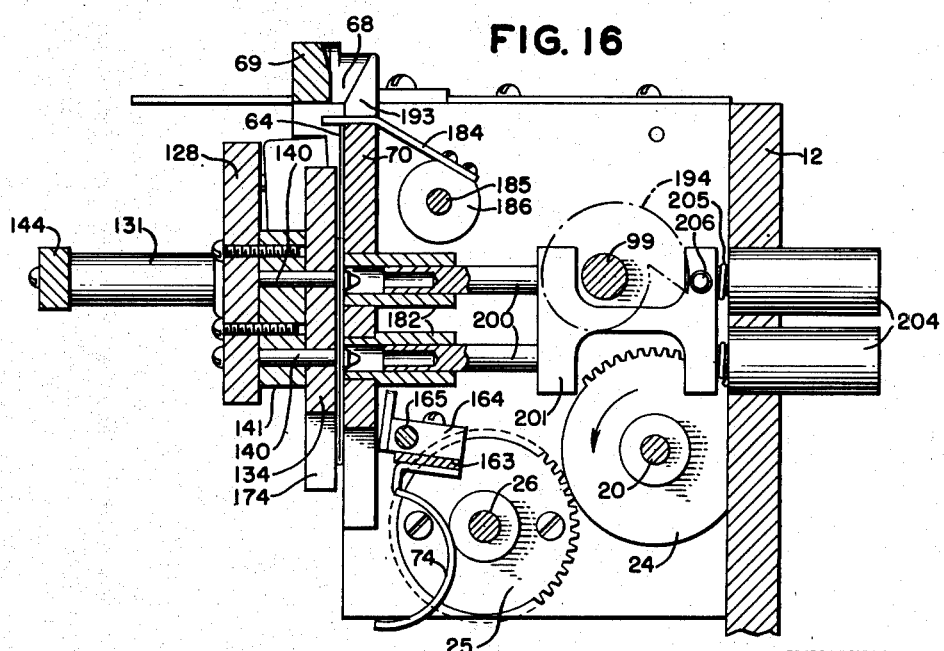

May 18, 1954     L. G. POLLARD ET AL     2,678,589
AUTOMATIC MESSAGE SEALING MACHINE
Filed March 22, 1951     17 Sheets-Sheet 12
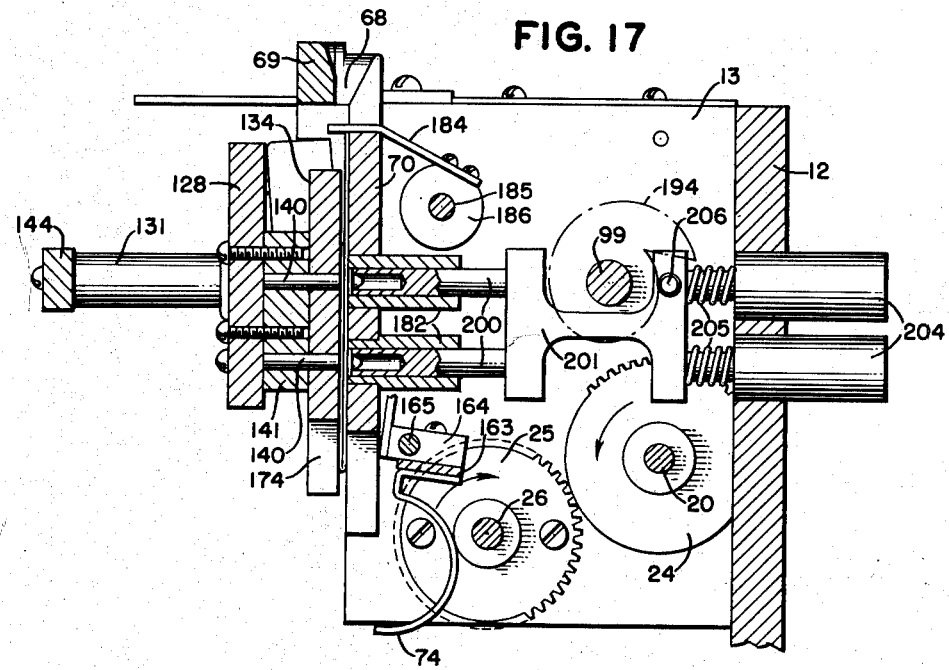
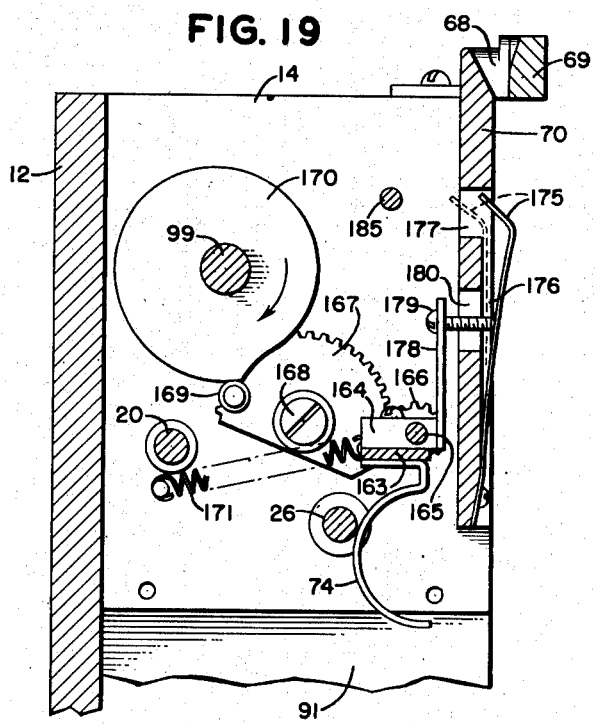
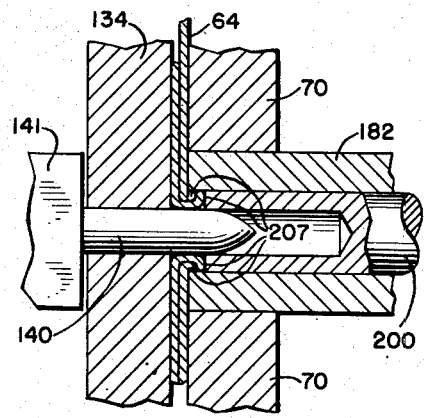
INVENTORS
L.G. POLLARD
G.H. RIDGE
G. JOHANSON
BY
ATTORNEY

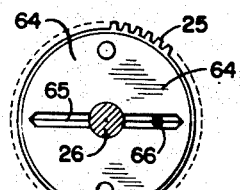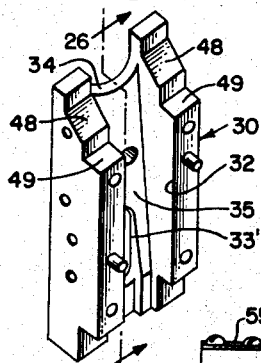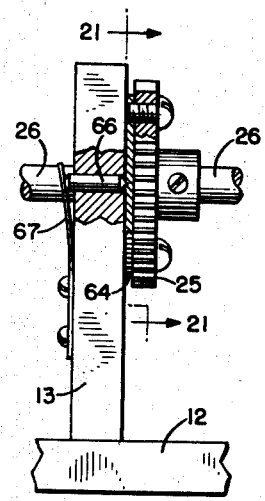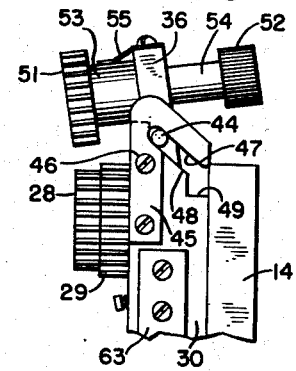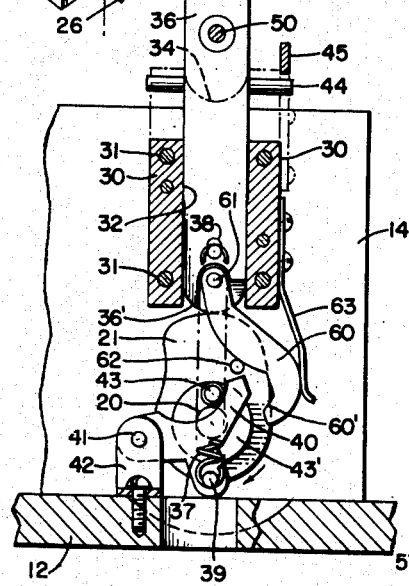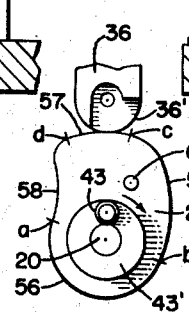

May 18, 1954 L. G. POLLARD ET AL 2,678,589
AUTOMATIC MESSAGE SEALING MACHINE
Filed March 22, 1951 17 Sheets-Sheet 14

*INVENTORS*
L. G. POLLARD
G. H. RIDGE
G. JOHANSON

BY
*A. G. Thomas*
ATTORNEY

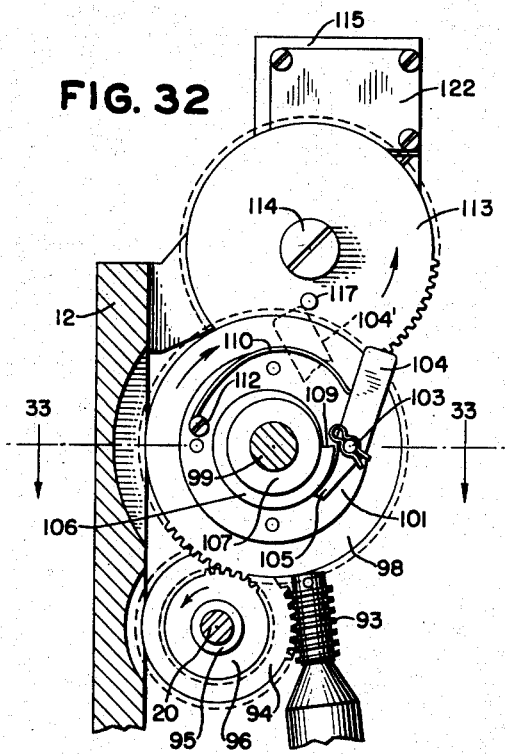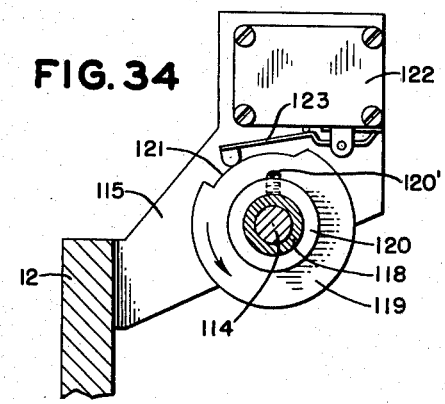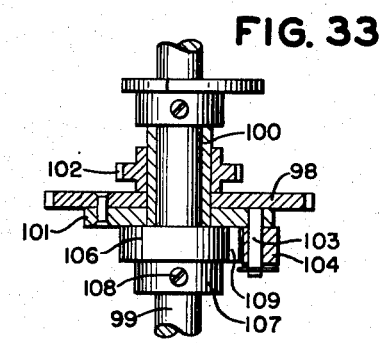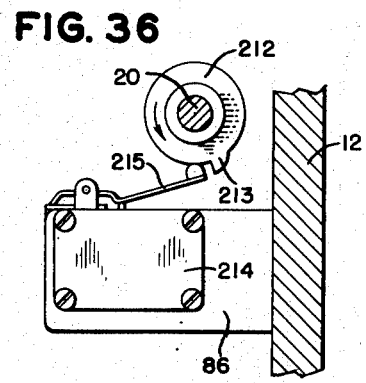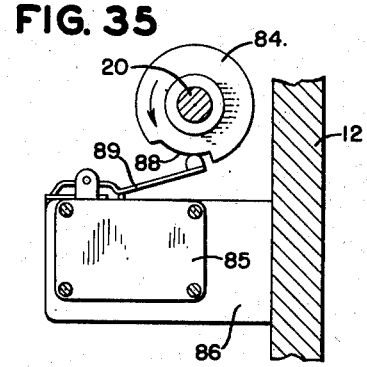

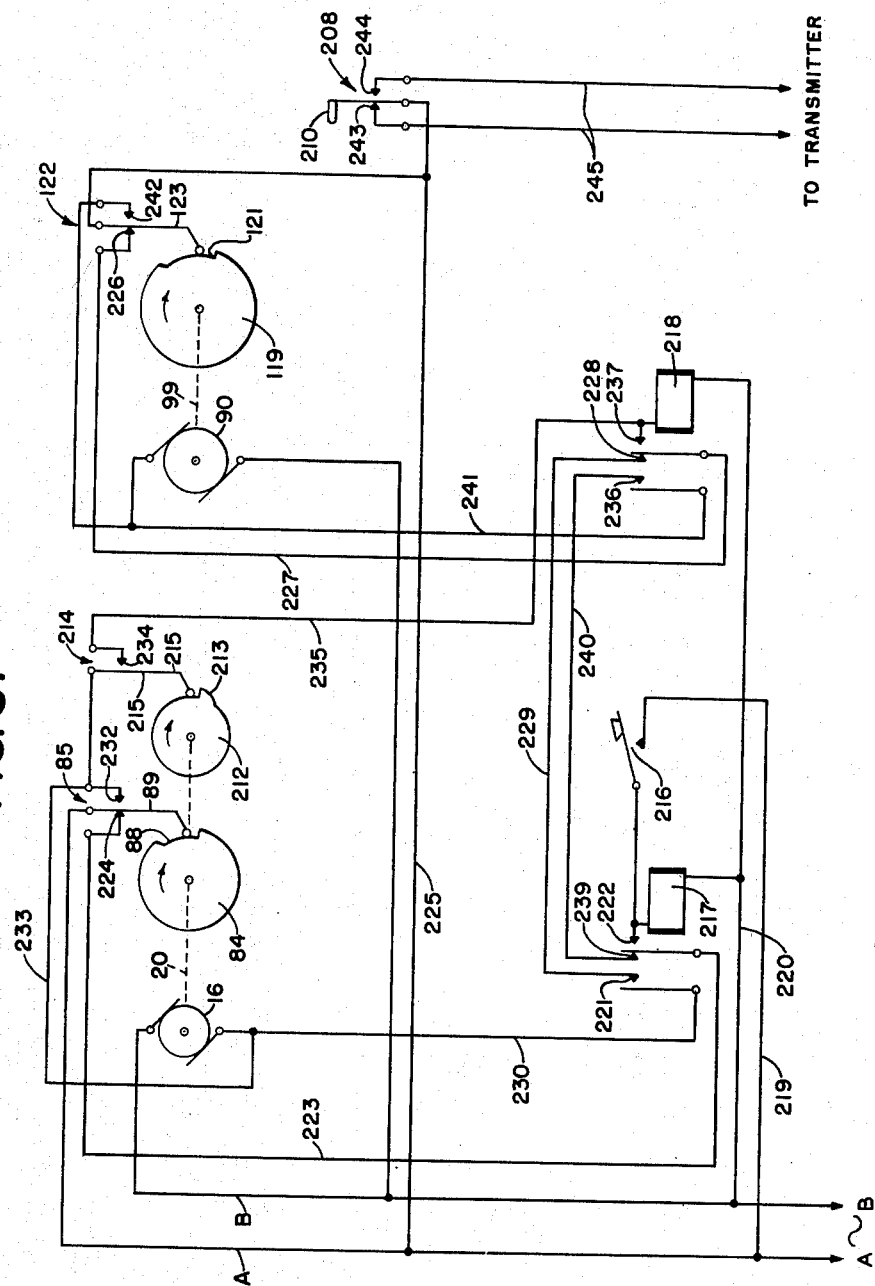

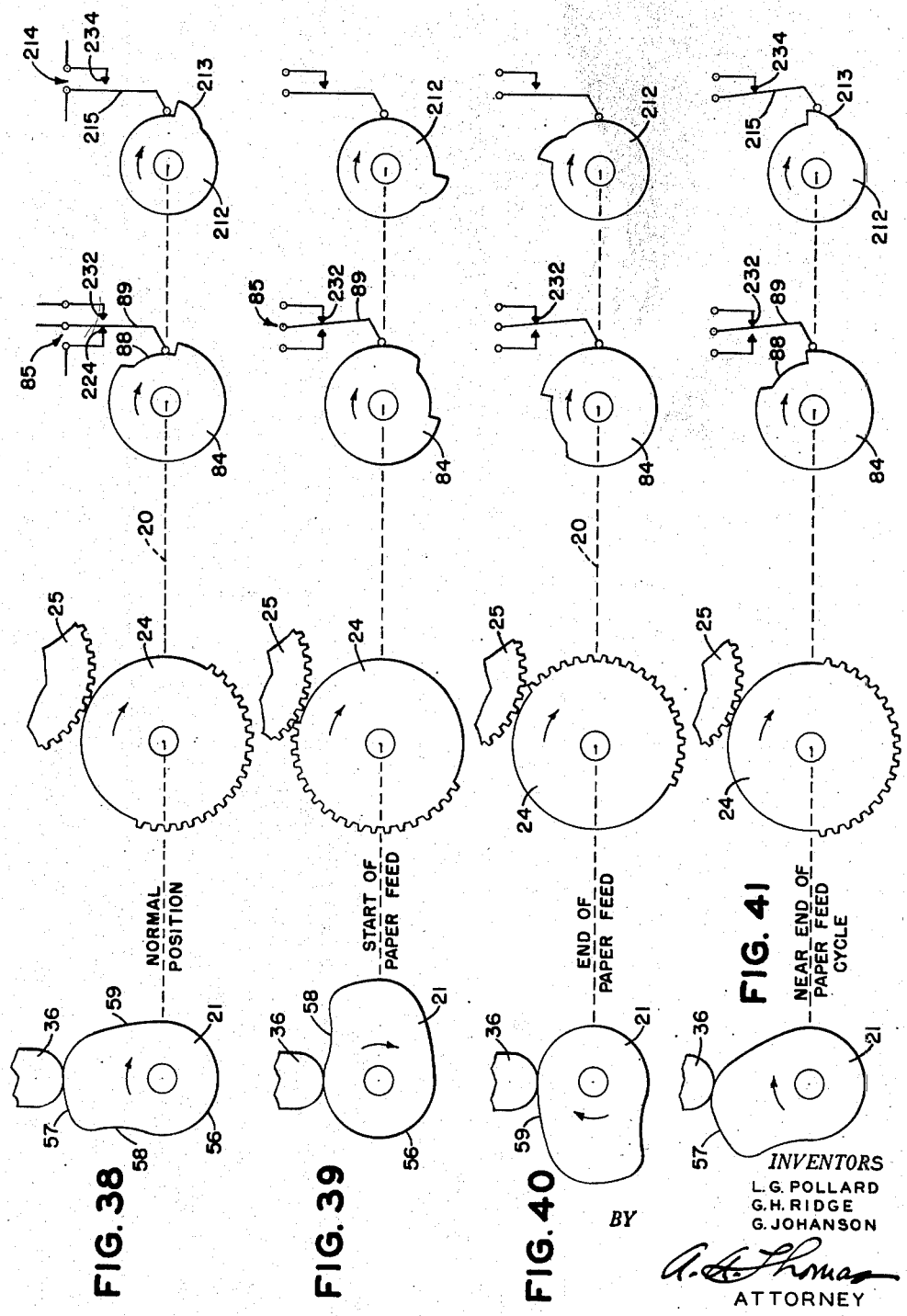

Patented May 18, 1954

2,678,589

UNITED STATES PATENT OFFICE 2,678,589

AUTOMATIC MESSAGE SEALING MACHINE

Leon G. Pollard and Guy H. Ridge, Southampton, N. Y., and George Johanson, Burbank, Calif., assignors to The Western Union Telegraph Company, New York, N. Y., a corporation of New York Application March 22, 1951, Serial No. 216,998

16 Claims. (Cl. 93—1)

Our invention is for a new and improved machine for automaticaly sealing telegrams in such a way that the contents of the message are concealed while the name and address remain visible. This automatic sealing mechanism is particularly adapted to be attached as a unit to automatic facsimile recorders from which the received message passes directly into the sealing unit. In the present case, we show this device independently of any recorder, for the sealing mechanism operates in the same way whether the message sheet is fed automatically from a recorder or is inserted by hand, as we shall assume here.

Broadly stated, the principle of operation of our sealing device comprises the consecutive steps of folding the blank into an open U-shape with the address portion remaining above the fold, then compressing the open U-shape into a closed fold, then punching holes through the double thickness of the folded paper, then lastly compressing the extruded rings of paper on the underside of the message into integral rivets which lock the folded portions of the sheet together. These steps are performed automatically and produce a self-sealed message in which only the name and address are visible.

The mechanism for carrying out the foregoing sequence of steps is operated by two motors. One motor feeds the inserted sheet downward over curved guide fingers which fold it back part way. The second or sealing motor thereupon operates a pressure plate to hold the folded blank against a die plate, whereupon a set of piercing punches and a set of riveting punches cooperate to seal the folded sheet.

The details of this apparatus are shown in the accompanying drawings which represent a commercial form of our invention as installed in a facsimile recorder for sealing the received messages.

In these drawings

Figure 1:
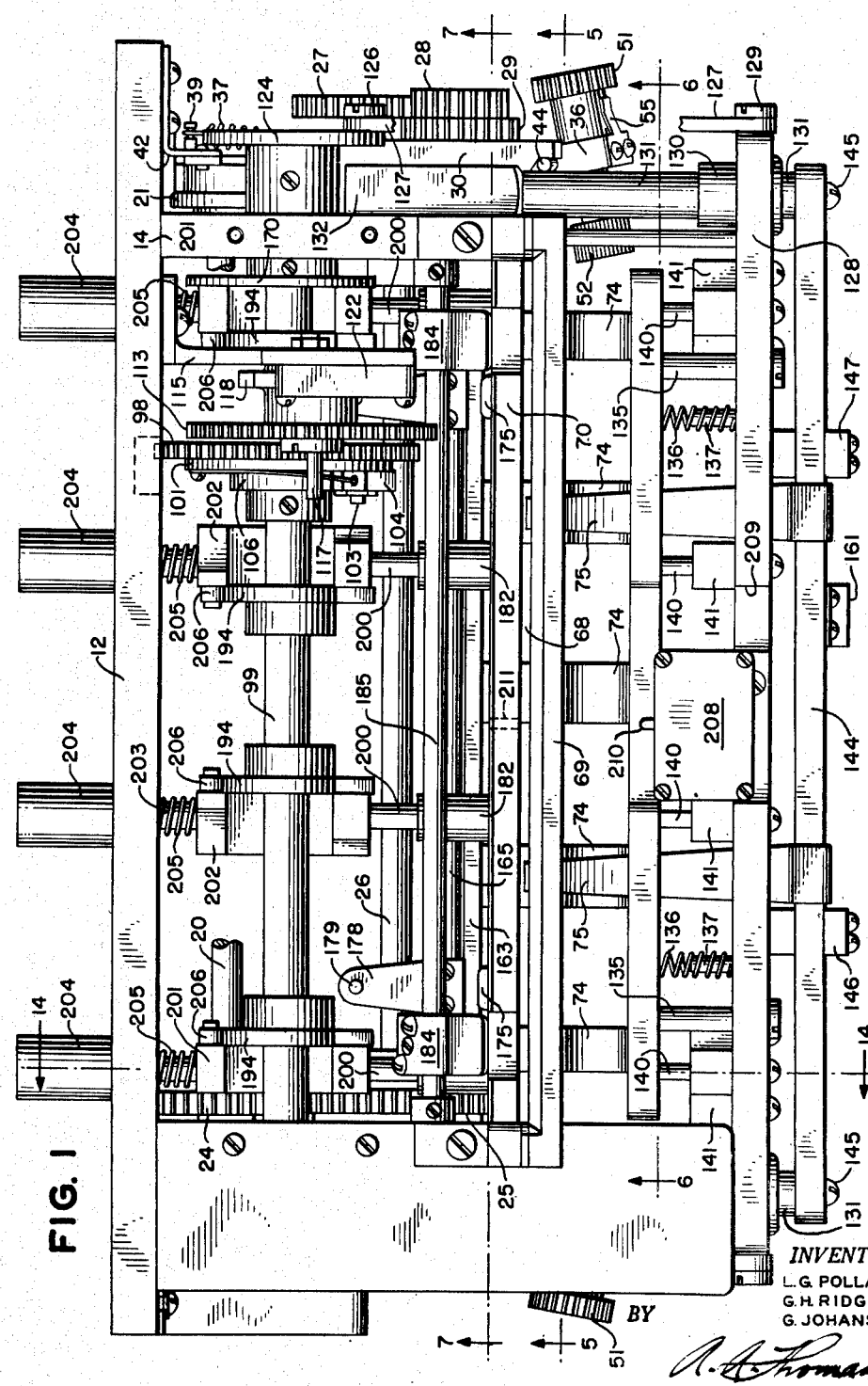
Fig. 1 shows a top view of the machine.
Figure 2:
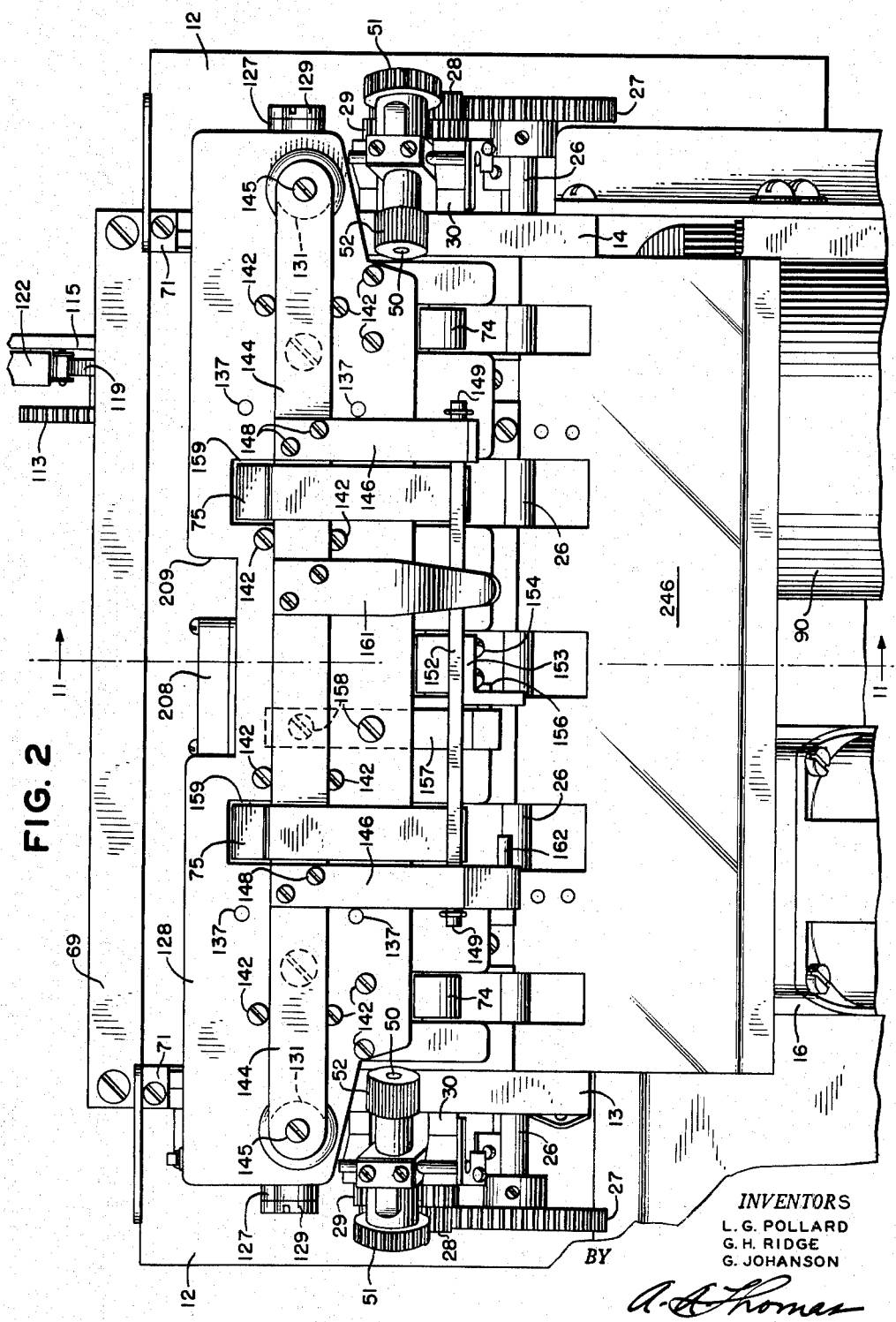
Fig. 2 is a front elevation.
Figure 10:
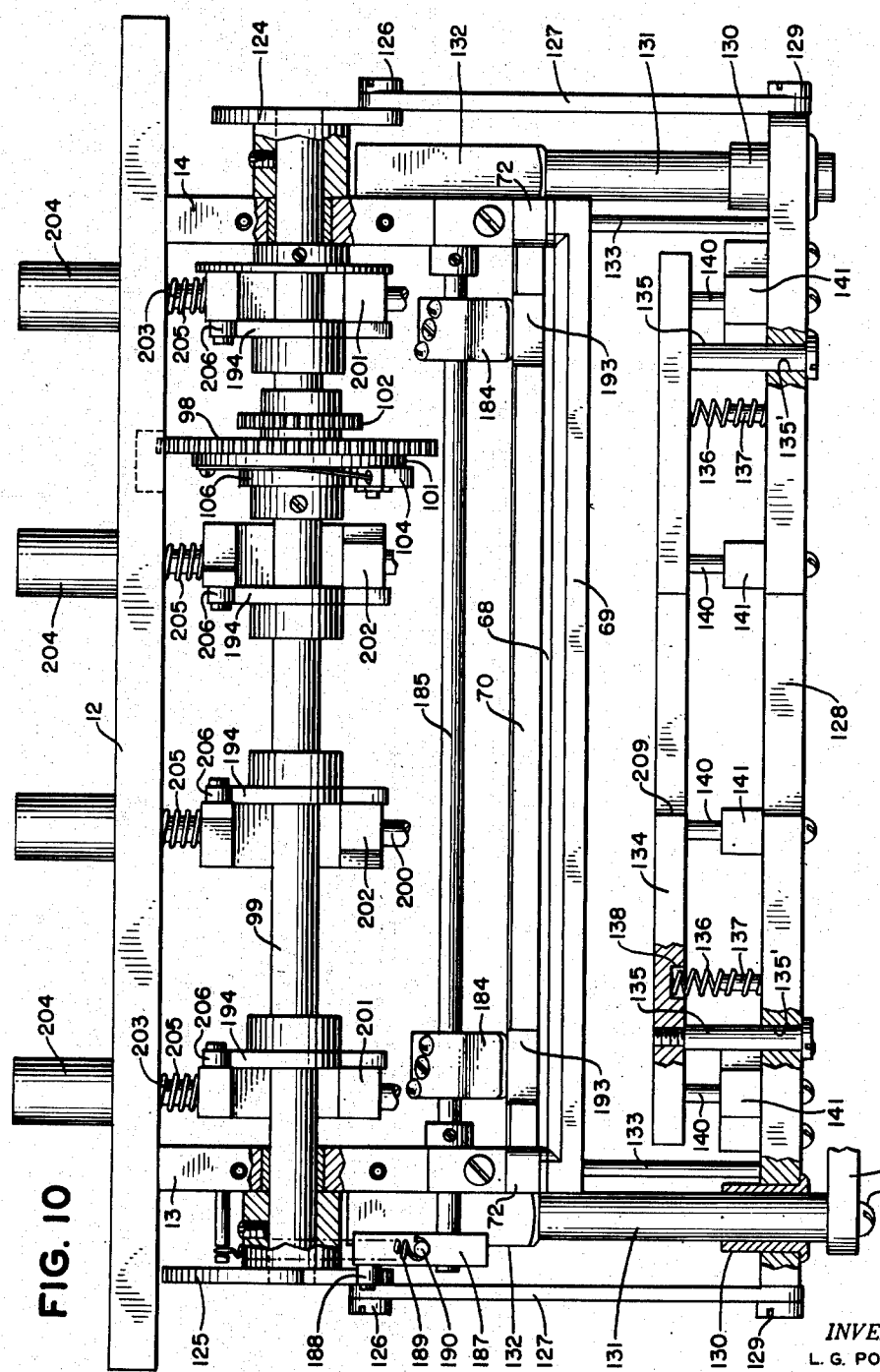
Figures 11, 12:
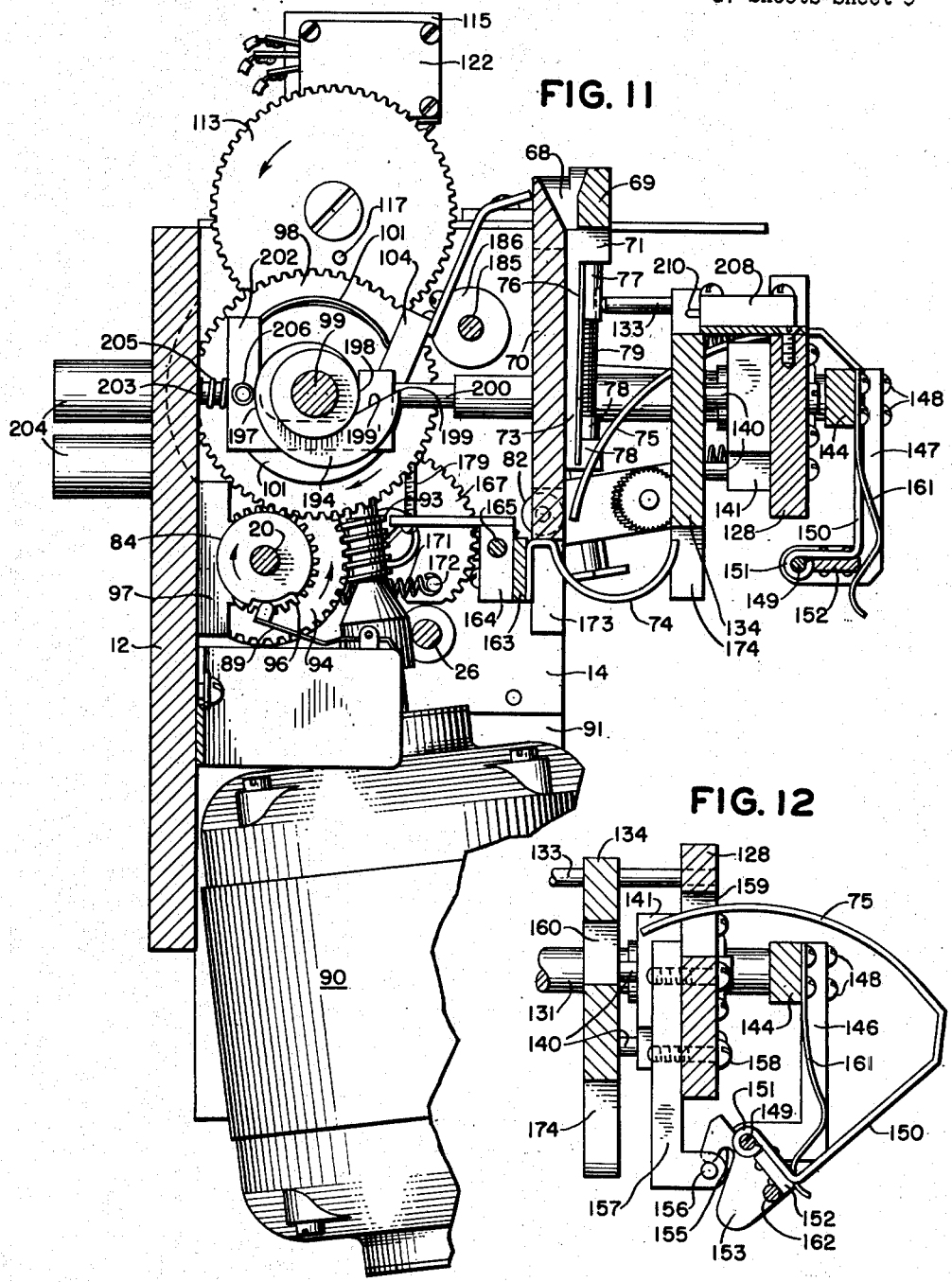
Figure 13:
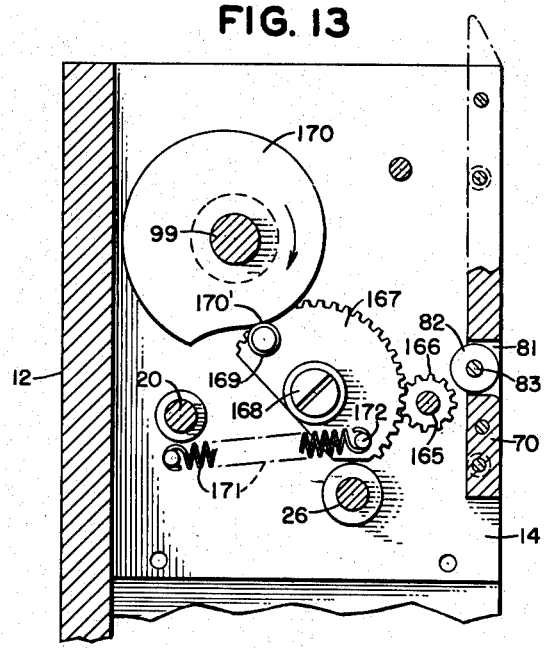
Figure 14:
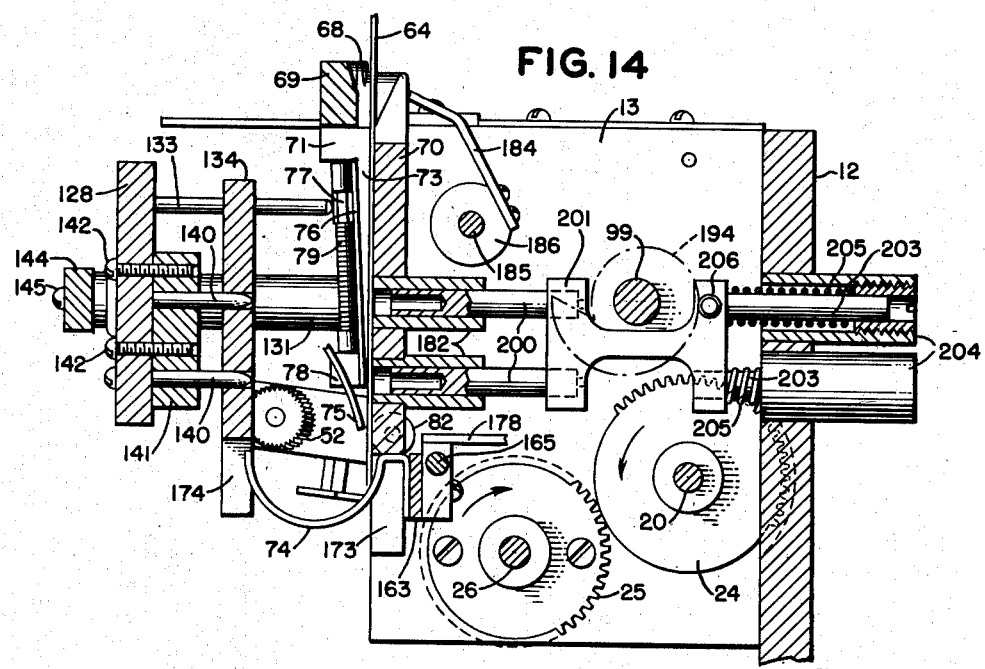
Figure 27:
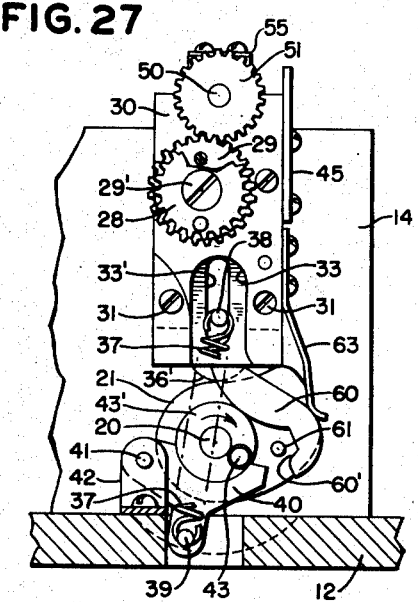
Figure 28:
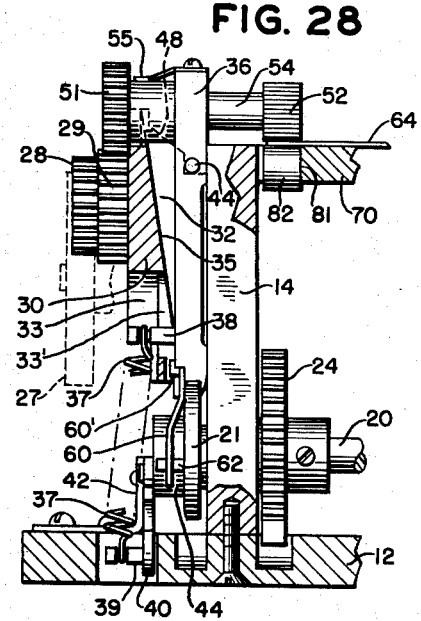
Figure 30:
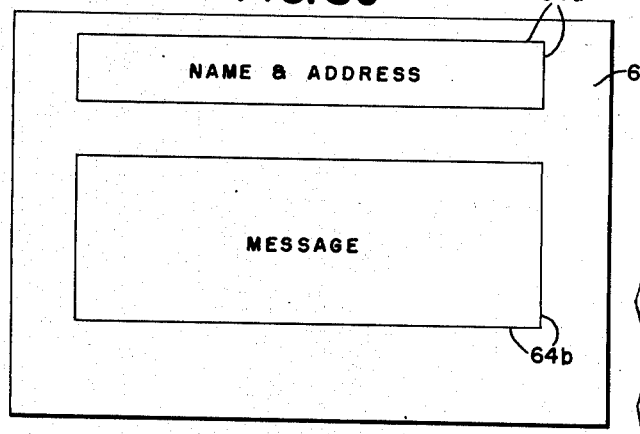
Figure 29:
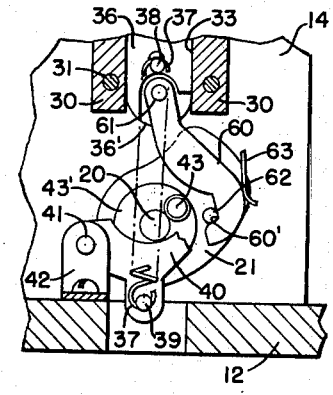
Figure 31:
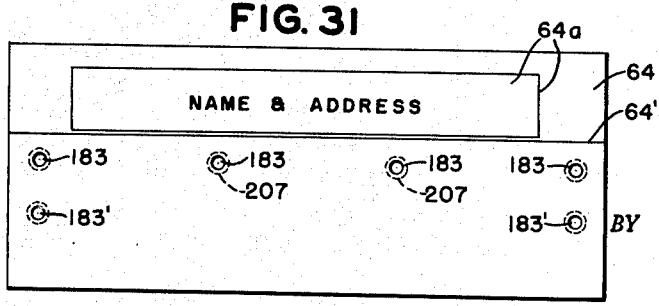

Figs. 5, 6 and 7 represent sectional views taken in the correspondingly numbered section lines 5, 6 and 7 of Fig. 1;

Fig. 8 shows the paper feed shaft and the parts mounted thereon;

Fig. 9 is a rear face view of the punch plate in detached position;

Fig. 10 is a plan view of the sealing mechanism;

Fig. 11 shows a section on line 11 of Fig. 2;

Fig. 12 shows a detail of Fig. 11 in a different position;

Fig. 13 is a section on line 13 of Fig. 7;

Fig. 14 shows a sectional view on line 14 of Fig. 1;

Figs. 15, 16 and 17 are views similar to Fig. 14 to show certain parts of the punch mechanism in different positions during the sealing cycle;

Fig. 18 shows an enlargement of the paper-piercing and riveting punches in final position;

Fig. 19 is a transverse section on line 19 of Fig. 5;

Fig. 20 is a section on line 20 of Fig. 7;

Fig. 21 is a section on line 21 of Fig. 20;

Fig. 22 shows a plan view of the paper feed assembly;

Fig. 23 shows a detail of Fig. 22;

Fig. 24 is a section on line 24 of Fig. 22;

Fig. 24A shows a separate view of the feed control cam;

Fig. 25 is a perspective of the guide piece appearing in Fig. 22;

Fig. 26 is a section on line 26 of Fig. 25;

Fig. 27 shows a view similar to Fig. 24 with certain operative parts in a different position;

Fig. 28 shows the mechanism in Fig. 22 in paper feeding position;

Fig. 29 presents a detail of Fig. 27 showing various parts in different positions;

Fig. 30 illustrates a message sheet in unfolded condition;

Fig. 31 shows the sheet as folded and sealed by the machine;

Fig. 32 represents a section on line 32 of Fig. 7;

Fig. 33 is a section on line 33 of Fig. 32;

Figs. 34, 35 and 36 are transverse sections taken on the correspondingly numbered lines 34, 35 and 36 of Fig. 7;

Fig. 37 is a diagram of the circuits for the feeding and sealing motors; and

Figs. 38 to 41 illustrate in a schematic way the positions of certain cams on the paper feed shaft during different phases of a feed cycle.

Figure 3:
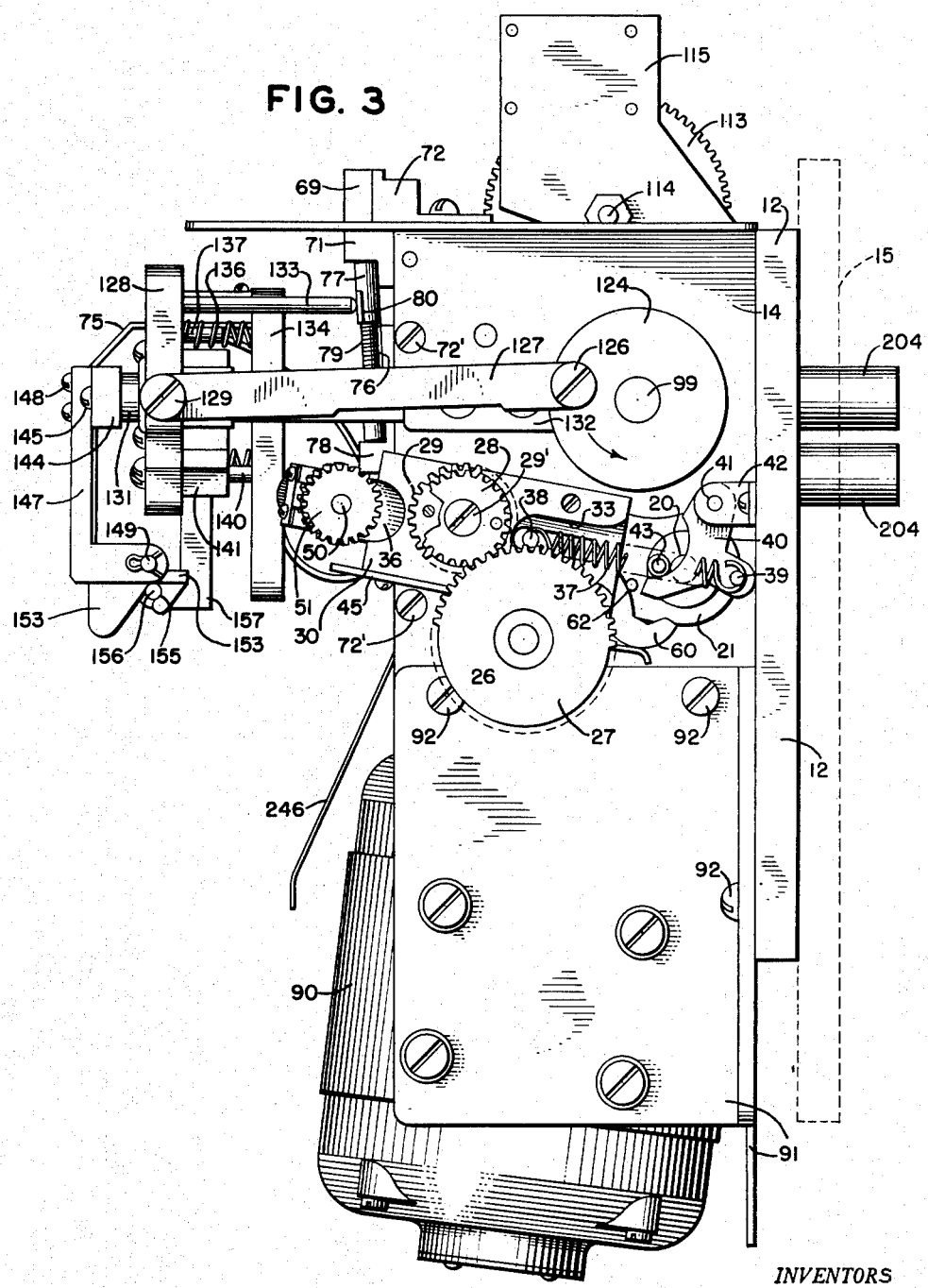
Figs. 3 and 4 show right and left side views respectively.
Figure 4:
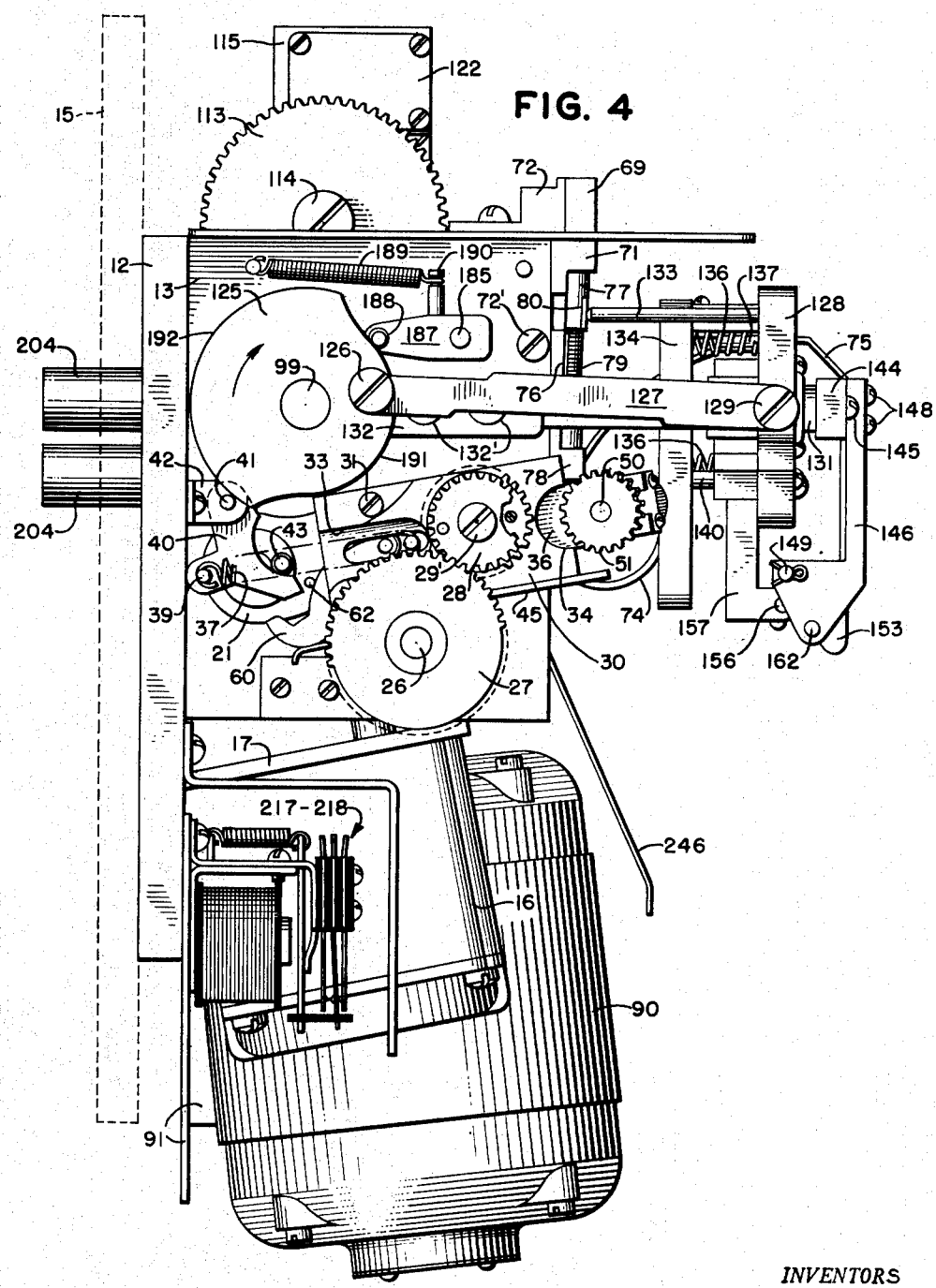

The main supporting frame of the machine comprises an upright base or back plate 12 and a pair of side plates 13 and 14 which are secured to the base and extend forward at right angles thereto. The rigid frame formed by the heavy parts 12, 13 and 14 supports all the mechanism of the machine and is attached as a unit to a vertical panel 15 (Figs. 3 and 4). When the machine is used in a facsimile receiver for the automatic sealing of recorded messages, it is mounted below the recording head. Such a receiver is disclosed, for example, in the pending application of Pollard et al., Serial No. 201,608, filed December 19, 1950.

The apparatus embodied in our machine involves two main automatic features: Feed mechanism for moving the deposited message sheet into correctly folded position, and sealing mechanism which acts on the folded sheet to seal up the text of the message by forming rivets integral with the sheet. These two mechanisms are so timed as to operate in automatic sequence. It will be best to describe first the feed mechanism.

*The paper feed mechanism*

Power is supplied to the paper feed mechanism by a small non-synchronous motor 16 mounted on the vertical base 12 by means of a bracket 17 (Figs. 4 and 7) with the shaft extending upward and slightly inclined to the rear. A worm 18 on the motor shaft meshes with a gear 19 fixed on a shaft 20 which is journaled in the sides plates 13 and 14 and extends slightly beyond them (Fig. 8). The projecting ends of shaft 20 have each a cam 21 keyed thereon. These cams are identical and shaped to have different operative portions on their periphery (Fig. 24A). The angular position of these cams on shaft 20 is the same for each. The function of cams 21 is to control certain gear connections for the paper feed operation, as will be explained in due course.

The feed shaft 20 carries at the left a half gear 24 which engages a full gear 25 (Fig. 14) for only one-half of each revolution of gear 24. The gear 25 is mounted in front of gear 24 on a shaft 26 which is journaled in the sides plates 13—14 and extends beyond them, as best shown in Fig. 7. The gears 24 and 25 are keyed on their respective shafts and always rotated with them. Each end of shaft 26 has fixed thereon a gear 27 suitably spaced from the adjacent supporting plate 13—14 outside thereto. The gears 27 are identical and each belongs to a train of gears for actuating a paper feed assembly, one at each side of the machine. Since the two paper feed assemblies are alike, the description of one will apply to both.

Referring to Fig. 22, a pair of connected gears 28—29 are mounted as a unit on a stud 29' carried by a guide piece or support 30 which is secured to the adjacent side plate 13—14 by screws 31. The smaller gear 28 is always in mesh with the large gear 27, as shown in Figs. 3 and 5. The guide piece 30, shown separately in Figs. 25 and 26, is a metal block formed with a longitudinal channel 32 at the back and having a front recess 33 open at the rear. The back wall of recess 33 has a slot 33' and at the forward end of the block is a half-circle notch 34. The channel 32 is backed by a sloping wall 35 for a purpose that will presently appear.

In the channel 32 of the stationary guide 30 operates a post or bar 36 (Fig. 22) which is mounted for slidable and tiltable movements. The rear or inner end 36' of the post 36 is rounded (Fig. 24) and arranged to be always in contact with the associated cam 21 on the paper feed shaft 20, whereby the sliding movements of the post are controlled by that cam. A contractile spring 37 is attached at its front end to a pin 38 and at the other end to a pin 39 on a depending anchor 40. The spring 37 always tends to pull the post rearward (to the right as viewed in Fig. 3), thereby holding it in pressure contact with the edge of cam 21.

The anchor 40 is pivoted at its upper end on a pin 41 carried by a lug 42 which projects from the vertical base 12. The spring 37 tends to rock the anchor 40 forward (or upward in Figs. 24 and 27) against a stop 43 mounted on a collar 43' of shaft 20. As this shaft rotates, the spring pulled anchor 40 follows the circular movement of stop 43. The function of the pivoted anchor 40 is to maintain the tension of spring 37 substantially constant during the sliding movements of the post 36 under the action of cam 21.

As seen in Figs. 22 and 23, the post 36 carries a cross pin 44 arranged to engage at one end a slotted guide bracket 45 attached by screws 46 to one side of the block 30. The bracket 45 has a slot 47 into which the pin 44 projects. The lower edge of slot 47 is formed by one of the two sloping shoulders 48 on block 30. These shoulders are cut away at the rear to form stops 49 for receiving the pin 44 when the post 36 is held down in paper feeding position (Fig. 28). We have shown only one guide bracket 45, but two may be used if desired.

At its forward end the post 36 supports a rotary cross shaft 50 (Fig. 22) which carries a gear 51 at its outer end and a paper feed wheel 52 at its inner end. Hubs or bushings 53 and 54 fixed on shaft 50 prevent axial movement of the shaft. This gear assembly consisting of the members 50 to 54 rotates as a unit on the post 36. A flat spring 55 attached to the top of post 36 is in constant pressure contact with the bushing 53 to act as a friction brake for instantly stopping the gear assembly when it is disconnected from the drive shaft 20.

Referring particularly to Fig. 24A, the rotary cam 21 which controls the movements of post 36 in the guide piece 30 has a low concentric edge 56 extending half way around between the points *a—b*, and a high concentric edge 57 which extends over the arm *c—d*. Between the points *d* and *a* (that is, from high to low position) is a concave edge 58 adapted to produce a sudden drop of the post 36 from the high cam edge 57 onto the low edge 56. Between the points *b* and *d* is a convex edge 59 which causes a gradual lifting of the post 36 from the low edge 56 to the high edge 57.

Figs. 22 and 24 show the raised position of the post 36 when it rests on the high cam edge 57. The spring 37 is so arranged that it tilts the post against the slanting face 35 of the guide piece 30, with the cross pin 44 resting on the sloping shoulders 48. As the cam 21 turns clockwise from the position shown in Fig. 24 to that shown in Fig. 27 (covering an arc of nearly 90°), the end of post 36 rides down over the edge of concave edge 58 and drops almost instantly onto the low concentric edge 56, which holds the post in down position for a half turn of the cam. During the downward movement of post 36 (that is, rearward as viewed from the front of the machine), the pin 44 rides over the slopes 48 and lands on the stop shoulders 49, whereby the post assumes the position shown in Fig. 28 to bring the gear 51 into mesh with the driving gear 29. The half-circle notch 34 in guide piece 30 receives the bushing 53 to permit the engagement of gears 51 and 29.

As the cam 21 turns, the stud 43 rocks the anchor 40 to move the pin 39 in unison with the movement of pin 38 on the post 36, so that the distance between the two pins remains constant. Consequently, the spring 37 remains at the same predetermined tension to exert a steady pull on the post 36 in its up and down movements. In order to guard against a failure of spring 37 to pull down the post 36, due to the friction of the pin 44 on the inclined shoulders 48, we provide a safety catch 60 (Figs. 27 and 29) pivoted on a stud 61 of post 36. The cam 21 has a pin 62 arranged to engage the catch 60 which is pressed against the pin by a leaf spring 63 attached to the side of the guide block 30.

When the spring 37 pulls the post 36 down, the safety catch 60 remains non-functional. However, should the post 36 happen to get stuck in its high position when the cam 21 is in the position in Fig. 24, the continued rotation of the cam will bring the pin 62 against the end shoulder 60' of catch 60 (Fig. 29), whereby the post is positively coupled to the cam and is pulled down into feeding position as shown in Figs. 27 and 28. In certain positions of cam 21, the spring-pressed catch 60 rides idly over the bushing 43' of the cam (Fig. 27).

It will be clear from what has been said that, with the post 36 in the down position shown in in Figs. 28, the paper feed shaft 20 drives the gears 51 through the meshing gears 24, 25 and 27—28 (Fig. 7) and through gear 29 to gear 51 (Fig. 28). Since the gear 24 on shaft 20 is a half gear, the feed wheel 52 on post 36 operates for only a half of each revolution of shaft 20. The cam 21 and half gear 24 are mounted in such angular relation on shaft 20 that the wheels 52 begin to turn almost immediately after the posts 36 are brought down into feeding position and they stop turning just before the cams 21 lift the posts into non-operative position.

When the half gear 24 disengages the full gear 25, it is necessary that the latter remain in position for proper re-engagement by the teeth of the half gear. For this purpose, we provide means for automatically causing the disengaged gear 25 to stop in such position that the advancing teeth of the half gear 24 will move smoothly into register with gear 25. Referring to Figs. 20 and 21, the gear 25 is attached to the inner side of a disk 64 which is provided with a diametric bevelled groove 65 adapted to receive the conical point of a pin 66 slidably mounted in the adjacent plate 13. A spring leaf 67 constantly urges the pin 66 toward the disk 64. At the end of each half turn when the half gear 24 disengages the gear 25, the pin 66 snaps into the groove 65 and holds the gear 25 in position to register with the half gear at the next half turn of the feed shaft 20.

We shall now describe how the two wheels 52 at the sides of the machine feed a deposited sheet 64, like that shown in Fig. 30, into position for sealing. At the top of the machine (Fig. 1) there is a long narrow slot 68 through which the sheet is inserted. This slot is formed by a cross bar 69 and a vertical plate 70 which is bevelled at the top to facilitate the insertion of the sheet (Fig. 14). The cross bar 69 is attached to the front top corners of the side plates 13—14. In the present machine, the bar 69 rests on little brackets 71 projecting from the plates 13—14 and the ends of the bar are fastened to blocks 72 mounted on top of the plates (Figs. 3 and 4). Any other practical means may be employed for securing the cross bar 69 rigidly to the side plates 13—14.

The vertical plate 70, called the die plate, is attached to the side plates 13—14 by screws 72' and forms a chute 73 (Fig. 14) for the deposited telegram, which rests on a plurality of semi-circular fingers 74 (in this case five) spaced across the length of the chute (Figs. 1 and 5). Two (or more) curved arms 75 extend into the chute 73 to hold the sheet against the plate 70, as seen in Figs. 1, 11 and 14.

At each side of plate 70 is a hinged gate 76 arranged aslant so as to engage the sides of the entering sheet and guide it toward the plate. As best shown in Fig. 5, each gate 76 is a narrow metal strip provided with a pivot pin 77 which is held at its upper end in the bracket 71 and at its lower end in a separate bracket 78 attached to the adjacent plate 13—14. A torsion spring 79 coiled about the pivot pin 77 normally holds the gate in closed position, as shown in Figs. 11 and 14. The gates 76 have each a lateral ear 80 (Figs. 3 and 4) by means of which they are swung open when the plate 70 starts moving inward, as will be explained later on.

Referring to Figs. 5 and 22, the die plate 70 is formed with a pair of rectangular recesses or notches 81 at its ends, and in each recess is pivotally mounted a small steel roller 82 by means of a shoulder screw 83. The rollers 82 are so arranged that, when the posts 36 are pulled down into operative position, the feed wheels 52 are brought in line with the rollers 82 and press against the inserted blank 64 (Fig. 28). The wheels 52 are preferably of steel with a knurled surface to engage the edges of the blank in firm traction contact. By comparing Figs. 22 and 28, it will be seen that when the feed wheels 52 are in withdrawn position, they are to one side of the die plate 70, so as to be out of the way when the sealing mechanism comes into operation.

As previously mentioned, when a telegram sheet 64 is inserted into the machine, it rests in its normal flat shape on the curved fingers 74 at the bottom of the chute (Fig. 14). At that time, the feed wheels 52 are withdrawn. When the two posts 36 are pulled down (that is, rearward as shown in Figs. 3 and 4) by the operation of the two cams 21, the wheels 52 move into contact with the side edges of the paper and push the sheet down over the curved fingers 74. These fingers guide the moving sheet smoothly into an open fold of U-formation, as shown in Fig. 15. The upper edge 64' of the fold is at such a distance from the top edge of the sheet that the fold completely covers the message area 64b while the address remains exposed above the fold.

With the paper positioned in open U-formation, it is ready for sealing and the feed mechanism automatically stops. This is brought about by a cam 84 fixed on shaft 20 and adapted to operate a microswitch 85 (Fig. 35) mounted on the base 12 by means of a bracket 86. This bracket is preferably adjustable vertically on the base by a slot-and-screw connection 87 or otherwise (Fig. 7). The cam 84 has an arcuate recess 88 and is arranged to operate an arm 89 of switch 85, this arm being constantly pressed against the cam by a spring inside the switch.

The circuits controlled by switch 85 will be explained in the description of the circuit diagram in Fig. 37, and at this time we need only mention that the feed motor 16 operates during the interval that the switch arm 89 rides over the high rim of cam 84. When the switch arm 89 drops into the recess 88, which occurs at the close of a paper feed cycle, the motor 16 stops after a second or two and the sealing mechanism automatically comes into operation. This will be fully understood when we come to Fig. 37.

*The sealing mechanism*

Referring to Figs. 3, 4 and 7, there is a second motor 90, called the sealing motor, mounted on an angled bracket 91 which is secured to the base 12 and the side plate 14 by screws 92. The motor shaft, which extends slightly rearward, carries a worm 93 in permanent mesh with a worm gear 94. As best shown in Fig. 8, the gear 94 is fixed on a sleeve 95 which is rotatably mounted on the feed shaft 20. The sheave 95 also carries a second gear 96. It will be seen that the parts 94—95—96 rotate as a unit driven by the motor 90 and operative independently of the feed shaft 20, which merely serves as a convenient support for that driving unit. A bearing 97 for shaft 20 is mounted on base 12 adjacent the sleeve 95 to steady the shaft as a support for the motor driven sleeve.

As seen in Figs. 32 and 33, the small gear 96 meshes with a large gear 98, rotatably mounted on a shaft 99 by means of a sleeve 100. This sleeve also carries a disk 101 and a pinion 102. The gears 98 and 102 are fixed on the sleeve and constitute therewith a rotary unit. The disk 101 is riveted to the face of gear 98 and carries a pin 103 on which a clutch pawl 104 is pivoted. The tip 105 of pawl 104 engages a ratchet 106 mounted on shaft 99 by a collar 107 which may be integral with the ratchet and is fixed to the shaft by a screw 108. The ratchet 106 has a single step 109 arranged to engage the pawl tip 105 in a driving connection. A leaf spring 110 attached at 112 to the disk 101 constantly urges the pawl tip 105 toward the ratchet 106.

It will be clear that the sleeve 100 and the parts mounted thereon (namely, the gears 98 and 102 and the pawl 104) constitute a unit rotatable on shaft 99 as one part of a clutch assembly. The other clutch part is the ratchet 106 which is fixed on the shaft 99. When the pawl tip 105 encounters the ratchet step 109, the shaft 99 becomes coupled to the sealing motor 90.

The pinion 102 on sleeve 100 meshes with a large idle gear 113 rotatably supported on a stud 114 projecting from a bracket 115 which is attached to the upright base 12 by screws 116 (Figs. 7 and 34). The idler 113 carries a pin 117 which extends into the path of the ratchet pawl 104. The rotary speed of gear 113 is half that of the pawl which is tripped by the pin 117 to disengage the ratchet 106 and thereby stop the shaft 99 after one revolution. The tripping position of pawl 104 is indicated by the dotted outline 104' in Fig. 32.

Referring to Fig. 34, the large gear 113 is mounted on shaft 114 by a hub 118 on which a cam 119 is fixed in correct angular position by means of a collar 120 and a set screw 120'. Therefore, the gear 113 and cam 119 always turn as a unit. The circular edge of cam 119 has a recess 121 for operating a microswitch 122 on bracket 115. An operating arm 123 of switch 122 is constantly spring-urged against the edge of cam 119. The circuits controlled by switch 122 will be explained in connection with Fig. 37, and at this point it suffices to say that when the pin 117 on idle gear 113 unclutches the pawl 104 to stop shaft 99, the cam 119 operates the switch to open the circuit of motor 90.

The shaft 99 is journaled in the side plates 13—14 and extends beyond them (Fig. 10). On the right end of shaft 99 is fixed a crank disk 124 and on the left end of the shaft is fixed a crank cam 125, the shape of which is seen in Fig. 4. Each crank member 124—125 carries a pin 126 for pivotally connecting a rod or link 127. The front ends of rods 127 are connected to a heavy punch plate 128 by pins 129 which project laterally from the sides of the plate. A front view of this plate appears in Fig. 2.

The punch plate 128 (Fig. 10) is provided near its end with a pair of sockets or bushings 130 adapted to receive a pair of fixed guide posts 131 in a slidable fit. The guide posts 131 have each a flat base portion 132 through which screws 132' (Fig. 4) pass into the adjacent side plates 13—14, whereby the posts are rigidly supported. It is clear from Figs. 3 and 4 that during the first half revolution of shaft 99 the plate 128 is pulled inward (toward the rear of the machine) a prescribed distance, and during the second half turn of the shaft the plate is returned to normal forward position. The punch plate 128 carries at its ends two long pins 133 arranged to engage the ears 89 of the hinged paper guide gates 76 (Fig. 3) and swing them forward out of the way when the plate starts moving in.

Behind the punch plate 128 is located a pressure plate 134 which is mounted on the punch plate by a pair of bolts or screws 135 (Fig. 10). Four expansion springs 136, properly located, normally hold the two plates spaced apart. The bolts 135 are screwed into the pressure plate 134 and pass freely through holes 135' in the punch plate 128, so that the plate 134 can move relatively to plate 128. The heads of bolts 135 act as stops to limit the separation of plates 128 and 134. The coil springs 126 are held in place by pins 137 on plate 128 and recesses 138 in plate 134 receive the rear ends of the springs.

The plate 128 carries a plurality of punches 140 (in this case six) projecting rearward from its inner face and arranged as shown in Fig. 9. These punches are pointed pins of hard metal mounted each in a small block 141 secured to the inner face of plate 128 by screws 142 or otherwise. The four upper punches 140 are evenly spaced and arranged in a row and the two lower punches are in line with the two end punches of the upper row. The pressure plate 134 has six holes 143 (Fig. 6) arranged to let the punches 140 pass through during the punching operation.

The particular arrangement of the punches in the present machine was dictated by the size of the telegram sheet for which this machine was designed. It will, therefore, be understood that the number and arrangement of the paper piercing punches 140 will depend upon the size of the sheet to be folded and sealed.

Referring to Figs. 1 to 4, there is a cross bar 144 rigidly connected to the ends of the two guide posts 131 by screws 145. Two pendant L-shaped brackets 146—147 are secured to the bar 144 by screws 148, and the lower arms of these brackets support a long hinge pin 149. The curved guide arms 75 have each an extension 150 (Figs. 11 and 12) which ends in a loop 151 for hinging the guide arms on the fixed pin 149. The two guide arms 75 are connected by a bar 152 to which the arms are riveted, so that they always operate as a unit.

To the underside of bar 152 is secured an angle bracket 153 by screws 154 (Fig. 2). The vertical side of this bracket has a slanting slot 155 (Figs. 3 and 12) arranged to receive a pin 156 projecting laterally from a pendant arm 157 which is attached to the rear face of the punch plate 128 by screws 158. The slot 155 and pin 156 form an actuating connection for the guide arms 75. Normally this pin-and-slot connection holds the arms 75 in rearward position where they extend into the message chute 73 (Fig. 11). The plates 128 and 134 are provided with holes 159 and 160, respectively, for free passage of the curved extensions of arms 75 (Fig. 12).

When the plates 128 and 134 begin to move rearward, the pin 156 rocks the bar 152 down, whereby the arms 75 are withdrawn from the message chute so as to be out of the way before the punching operation takes place during the further rearward movement of the plates. The bar 152 is held in actuated position (Fig. 12) by a leaf spring 161 mounted on the cross bar 144. A pin 162 on bracket 146 is arranged to engage the bar 152 and stop its downward movement.

The paper folding fingers 74 are secured at the rear to a bar 163 (Figs. 12 to 15). This bar carries near its ends a pair of blocks 164 which are keyed on a shaft 165 pivoted in the side plates 13—14. On the right end of shaft 165 (Figs. 13 and 19) is fixed a pinion 166 which meshes with a segmental gear 167 mounted on a stud 168 on the side plate 14. The gear 167 has a roller 169 arranged to engage the periphery of a cam 170 fixed on shaft 99. A contractile spring 171 is attached at one end to plate 14 and at its other end to a pin 172 on gear 167, whereby the roller 169 is always held in pressure contact with the edge of cam 170. Let it be observed that the cam edge gradually rises from its lowest point 170' where the roller 169 is normally held by the spring 171.

Fig. 13 shows the normal position of gear 167 and cam 170, and the fingers 74 are then held in forward or folding position as seen in Fig. 11. Slots 173—174 in the bottom edges of plates 70 and 134, respectively, make room for the fingers 74 in normal position. When the shaft 99 starts to rotate (clockwise in Fig. 13), the rising edge of cam 170 pushes the roller 169 along and thereby turns the segmental gear 167, which thus rotates the shaft 165 in a direction to swing the fingers 74 downward to the rear (Fig. 19), out of the way of the sealing mechanism. When the cam 170 completes its single turn, the roller 169 drops suddenly onto the lower portion of the cam (Fig. 13) and the fingers 74 are moved back to normal position. This happens at the close of each sealing cycle.

The finger operating shaft 165 also performs the function of actuating a pair of ejector springs 175 (Fig. 19) which normally lie in recesses 176 in the front face of the die plate 70, so as to be entirely out of the paper chute. The bent heads of ejectors 175 extend through holes 177 in plate 70. The blocks 164 on shaft 165 have each a short arm 178 which carries a screw or pin 179 arranged at right angles to the arm. Normally the screws 179 extend upward away from the plate 70 (Fig. 11). When the shaft 165 is operated to withdraw the folding fingers 74 (Fig. 19), the screws 179 project through holes 180 in the die plate 70 and push the ejector springs 175 forward across the paper chute to dislodge the sealed message if it should get stuck to the die plate.

The fixed plate 70, which forms the rear wall of the message chute, carries a plurality of hollow dies 182 which are tubular pieces or bushings of hard metal rigidly fixed in the plate and arranged to receive the punches 140 on plate 128. Looking at Figs. 15 and 16, we see that when the plates 128—134 start moving rearward, the open U-fold of sheet 64 is flattened between the fixed die plate 70 and the spring mounted pressure plate 134, whereupon the further advance of plate 128 pushes the punches 140 through the paper into the dies 182. While it is more practical to have the dies 182 as separate pieces inserted in plate 70, we include the idea of a plate having merely holes for receiving the punches 140.

By comparing Figs. 15 and 16, it will be seen that during the compression of the folded sheet from open to closed form, the curved front section slides up above the upper row of punches which pierce holes 183 in the paper near the top edge 164 of the fold (Fig. 31). The two lower punches make holes 183' at the sides of the folded sheet. To guard against the paper creeping up on the die plate 70 during the compression of the fold, we provide a pair of stop fingers 184 which engage the top edge of the paper (Figs. 16 and 17) and hold the rear portion of the sheet in register with the front portion before the punches 140 pierce the paper. The stop fingers 184 operate automatically as follows.

Referring to Fig. 10, there is a shaft 185 journaled in the side plates 13—14, and this shaft carries two hubs 186 on which the fingers 184 are mounted at the correct angle (Fig. 15). At its left end the shaft 185 extends beyond the supporting plate 13 and carries an arm 187 (Fig. 4) which has a roller 188 engaging the periphery of cam 125. A contractile spring 189 is connected at one end to a pin 190 on arm 187 to hold the roller 188 in constant pressure contact with the cam edge. When the roller rides over the low section 191 on cam 125, the paper stop fingers 184 are in retracted position as shown in Fig. 15. When the roller 188 is on the high cam edge 192 for half a turn of the cam, the shaft 185 is rocked forward and swings the fingers 184 across the message chute (Fig. 16) to engage the top edge of the deposited sheet during the punching interval. The die plate 70 has two slots 193 in its top edge for the passage of the fingers 184.

The shaft 99, which is driven by the sealing motor 90 through the clutch parts 104 and 106, as previously explained, carries a plurality of cams 194 (in this case four), as shown in Figs. 7 and 10. Each cam has a hub 195 which receives a set screw 196 for mounting the cam rigidly on the shaft. As all of these cams are alike, it will be sufficient to describe the one seen in Fig. 11. The cam has a spiral edge 197 which starts from a low point 198 and ends after a full turn at the high point 199, which connects with the low point by a straight receding edge 199'.

The function of cams 194 is to operate a set of hollow riveting punches 200 (Fig. 14) arranged to slide in the tubular dies 182 on plate 70. There are six riveting punches 200 corresponding to the six piercing punches 140 on plate 128. The riveting punches are supported on two end blocks 201 (Fig. 14) and on two intermediate blocks 202 (Fig. 11). The end blocks 201 are H-shaped with the front vertical arm of each supporting two punches 200 and the rear arm supporting two guide pins 203. These pins extend rearward into a pair of tubular sockets 204 fixed in the base 12 (Fig. 14). Coil springs 205 encircling the pins 203 constantly tend to push the supports 201 forward. The intermediate blocks 202 are L-shaped (Fig. 11) and each carries only one riveting punch 200 and one spring pressed guide pin 203 extending into the aligned socket 204.

The six blocks 201—202 carry each a roller 206 arranged in line with the adjacent cam 194 (Figs. 1 and 10). The coil springs 205 hold the rollers 206 in pressure contact with the spiral edges of the cams. The normal position of the cams 194 and the corresponding position of the six blocks 201—202 are illustrated in Fig. 14, where it will be seen that the riveting punches 200 are slightly withdrawn from the front end of the dies 182. This is the position of the riveting punches during the paper feed operation; that is, while the inserted sheet is moved from its initial position in Fig. 14 to its open folded position in Fig. 15.

As the punch plate 128 starts to move in (to the right in Fig. 15), the cams 194 turn leftwise and gradually force the blocks 201—202 rearward, thereby moving the riveting punches farther out of the fixed dies 182 (compare Figs. 15 and 16). At the moment that the high points 199 of cams 194 pass by the rollers 206, the compressed springs 205 jam the hollow punches 200 forward with a hammer blow against the extruded rings or rims of the perforated paper. The effect of this operation, as illustrated in the magnified view of Fig. 18, is to compress or crimp the extruded rims of paper around the pierced holes to form sealing rivets 207 of double thickness. These paper rivets, which are integral with the blank, effectively seal the folded message (see Fig. 31) which can not be opened without tearing the rivets. Nor can the message be resealed after being once opened.

Upon completion of the riveting operation, which takes place at the end of the first half turn of cam shaft 99, the continued rotation of this shaft moves the plates 128 and 134 forward and the punches 140 are withdrawn from the paper. At the same time the cam 170 (Fig. 19) operates the ejector fingers 175 to push the riveted sheet away from the die plate 70, whereupon the sealed message falls into a suitable compartment for removal. Just before the plates 128 and 140 complete their return movement, the folding fingers 74 are swung forward to normal position (compare Fig. 17 with Fig. 11) by the spring actuated gear 167. At the same time, the pin 117 on gear 113 trips the clutch pawl 104 (Fig. 32) to uncouple the sealing motor 90 from the shaft 99. When the pawl 104 disconnects the motor, the cam 119 (Fig. 34) is in position to operate the switch 122 to open the motor circuit, and the machine is now ready for the next message.

Since the particular message sealing machine illustrated in the drawings was designed as an adjunct to a facsimile recorder adapted to be connected with a distant main office transmitter, we have provided a so-called message finder switch 208 for sending an acknowledgement signal to the main office when there is a blank in the machine. The switch 208 is conveniently mounted in a recess 209 on the punch plate 128 (Figs. 1 and 2), and a pin 210 projecting from the switch casing is in line with a hole 211 in the die plate 70.

When there is no paper in the machine, the pin 210 enters the hole 211 and the switch will not be operated. However, when a blank is in the chute 68, the pin 210 is pushed against the interposed paper and is thereby actuated to send a signal to the main office operator, who is thus informed that the message has been received and sealed for delivery. The circuits controlled by the switch 208 do not belong to this invention and we have mentioned them briefly to explain the purpose of the paper controlled switch 208.

We have previously stated that the sealing cycle starts automatically at the close of the feeding cycle when the paper feed motor 16 is deenergized by the cam 84 on shaft 20 actuating the switch 85 (Fig. 35). This operation of cam 84 is timed with the operation of a companion cam 212 (Fig. 36) that controls the sealing motor 90. The cam 212, also fixed on the feed shaft 20, has a tooth 213 adapted to actuate a microswitch 214 mounted on the bracket 86 next to the switch 85. The switch 212 has an arm 215 which is spring urged against the cam 212. The angular relationship of cams 84 and 212 is such that the circuits controlled by the associated switches 85 and 214 cause the feed motor 16 to stop before the sealing motor 90 can start. This will be clear from the circuit diagram shown in Fig. 37, which will now be described.

*The cam controlled motor circuits (Fig. 37)*

When our sealing unit is attached to a facsimile recorder, the received message is automatically cut off from a roll of paper in the machine and drops into the slot 68 of the sealing unit, whereupon the feed motor 16 is automatically started upon the closing of a switch in the recorder (not shown). For the purposes of this description the switch 216 in Fig. 37 may be considered to represent any kind of automatic or hand switch adapted to be closed momentarily after the message to be sealed has been deposited in the sealing unit. The source of power for the motors 16 and 90 is indicated by a pair of conductors A and B plugged into a house lighting circuit of the conventional 120-volt 60-cycle type.

We are to assume that in Fig. 37 the cams 84 and 212 on the feed shaft 20 and the cam 119 on the sealing shaft 99 are shown in the position they occupy when the machine comes to rest at the close of a sealing cycle. It should be noted that the cam engaging arms of the three switches 85, 214 and 122 rest each on the lower surface of the associated cam. The feed motor 16 is controlled by a relay 217, and a second relay 218 controls the sealing motor 90. In the actual machine the relays 217 and 218 are mounted for convenience on the base 12 as a unit beside the feed motor 16, as shown in Fig. 4.

The closing of switch 216 energizes the relay 217 through wires 219 and 220. The energized relay pulls up and closes its contacts 221 and 222, locking through its contact 222, wire 223 and the closed contact 224 of switch 85. The opening of switch 216 does not therefore affect the energized relay 217. The circuit of the feed motor 16 is now completed from conductor A through wire 225, closed contact 226 of switch 122, wire 227, closed contact 228 of relay 218 (not energized), wire 229, closed contact 221 of the energized relay 217, wire 230, and through the windings of motor 16 to conductor B.

After the shaft 20 has turned through a small angle, the switch arm 89 rides up on the high edge of cam 84, thereby opening the contact 224 and closing the companion contact 232. This deenergizes the relay 217, but the circuit of motor 16 is now closed through the switch contact 232 and wire 233.

As the feed shaft 20 nears the completion of one revolution, the switch arm 215 rides over the tooth 213 and closes the contact 234. At this point, be it remembered, the inserted message has been fed into open U-form for sealing (Fig. 15) and the feed wheels 52 have been lifted by the cams 21 into inoperative position (Fig. 22). In other words, the machine is ready for the sealing operation and the closing of switch contact 234 energizes the relay 218 through the following circuit: from conductor A through the closed switch contact 232 (the arm 89 is still riding over the high cam edge), contact 234, wire 235, through relay 218, and by wire 220 to the power line B.

The energized relay 218 pulls up and closes its contacts 236 and 237, at the same time opening the contact 228. As soon as the switch arm 89 drops back into the arcuate recess 88 of cam 84, thereby opening the circuit of the feed motor 16 at contact 232, the sealing motor 90 is energized through the following circuit: from A through closed contact 224 of switch 85, wire 223, closed contact 239 of the deenergized relay 217, wire 240, closed contact 236 of energized relay 218, wire 241, and through the motor windings to line B. At this moment the switch arm 123 rides in the recess 121 of cam 119, so that the contact 226 is closed and the relay 218 locks through its contact 237, wire 227, contact 226, and by wire 225 to conductor A.

After the shaft 99 has turned through a certain angle, the switch arm 123 rides over the high edge of cam 119, thereby breaking the contact 226 of switch 122 and closing the companion contact 242. This deenergizes the relay 218 and closes the circuit of the sealing motor 90 as follows: from A through wire 225, closed contact 242, and through the motor windings to B. When the shaft 99 completes one revolution, during which interval the message is sealed, the switch arm 123 drops back into the recess 121 of cam 119, thereby breaking the circuit of motor 90 and thus stopping the machine. The cams 84, 212 and 119 are now back to their normal position, as shown in Fig. 37.

Regarding the so-called message finder switch 208 in Fig. 37, we need but say that its contacts 243 and 244 are connected to a pair of lines 245 which go to a distant transmitter in a facsimile system using a recorder provided with our sealing unit. When the switch arm 210 is actuated by the presence of a blank in the punch mechanism, it sends an acknowledgment signal back to the main office. Should this signal not be received, the central operator is thereby informed that the transmitted message has not been sealed due to some failure of the machine. The agent in charge of the receiving station will thereupon investigate the matter.

*Sequence of operations during a feeding cycle (Figs. 38–41)*

The diagrams in Figs. 38–41 illustrate the angular relationship between the feed control cam 21 and the motor control cams 84 and 212 during one revolution of shaft 20 on which those three cams are mounted.

Normally, when the machine is at rest, the parts referred to are in the positions shown in Fig. 38; that is to say, the post 36 rests on the high edge 57 of cam 21, thereby holding the paper feed wheels 52 inoperative while the cams 84 and 212 are in position to hold the motor circuits open (Fig. 37). Also, the teeth on the half gear 24 are out of engagement with the gear 25 which operates the feed wheels 52.

When the feed motor 16 is energized by the closing of switch 216 (Fig. 37), the shaft 20 begins to rotate. During the first 90° or quarter turn of the shaft, assumed to rotate clockwise, the parts mounted thereon have moved to the position shown in Fig. 39 and the machine is in this condition: The post 36 has dropped down to bring the feed wheel 52 into contact with the deposited sheet 64 (Fig. 28). The half gear 24 has meshed with gear 25 to operate the feed wheel 52. The cam 84 has closed the switch contact 232 and thereby cuts out the relay 217, as explained in Fig. 37. At this time the cam 212 is still turning idly.

During the next half turn of shaft 20 (from Fig. 39 to Fig. 40) the half gear 24 remains in mesh with the feed gear 25 and the inserted blank is fed into the open U-form illustrated in Fig. 15. At the end of this half turn of shaft 20, the half gear 24 releases the gear 25 and the paper feed stops. In other words, Fig. 40 shows the feed shaft 20 at the end of the paper feed operation, but the motor 16 is still running because the switch contact 232 is still closed. The cam 212 has not yet begun to function.

During the last quarter turn of shaft 20 (from Fig. 40 to Fig. 41) the post 36 is slowly raised by the convex edge 59 of cam 21 while the feed gear 25 remains idle. Just before the shaft 20 completes its full turn (Fig. 41), the switch contact 234 is closed by the tooth on cam 212, while the switch contact 232 is still held closed by the cam 84. At this point, the relay 218 in Fig. 37 is energized, but the sealing motor 90 does not start to operate until the switch arm 89 drops into the recess 88 of cam 84 to disconnect the feed motor 16 as the shaft 20 completes its revolution and is back in normal position (Fig. 38). It is thus clear that the sealing motor 90 can never operate until the paper feed motor 16 has stopped, so that the sealing operation follows automatically upon completion of the paper feed cycle.

*Summary of operation*

The operation of our automatic message sealing machine will be fully understood from the preceding description, but it will be helpful to review briefly the various steps that take place during the feeding and sealing cycles.

When the machine starts to operate after the insertion of the message to be sealed, one revolution of shaft 20 feeds the blank downward and the curved fingers 74 automatically fold it into the open U-form shown in Fig. 15. At this point, the feed mechanism stops and the sealing motor is energized to rotate the cam shaft 99, which in this particular machine makes one revolution in six seconds. In the course of this revolution, the following functions are performed:

As soon as the shaft 99 starts turning, the side cams 124 and 125 begin to pull the spring connected plates 128 and 134 rearward. The long pins 133 on plate 128 open the hinged side gates 76 to permit advance of the pressure plate 134. During the first quarter revolution of shaft 99, the guide arms 75 are withdrawn, the fingers 184 are moved forward to engage the top edge of the paper, the folding fingers 74 are swung out of the way by cam 170, and the pressure plate 134 starts to compress the folded sheet. During the second 90° turn of shaft 99, the paper is compressed by the advancing plate 134 (Fig. 16) and the punches 140 pierce the paper. At the moment of maximum penetration by the piercing punches, the cams 194 release the riveting punches 200 which seal the folded message portion of the blank.

As the plates 128 and 134 begin their forward or return movement during the second half revolution of shaft 99, the fingers 175 are pushed forward (Fig. 19) to strip the sealed message from the die plate 70. The folding fingers 74 are still held back and leave a clear path for the message to fall into the receptacle at the bottom of the machine. A guide plate 246 attached to the lower edge of plate 70 by screws 247 guides the falling message into a suitable delivery receptacle (Figs. 2, 3 and 4).

The continued return movement of plates 128 and 134 causes the cam 170 to swing the folding fingers 74 back into the message deposit chute, while simultaneously withdrawing the stripping fingers 175 from the chute. As the punch plate 128 nears its normal forward position, the curved guide fingers 75 are swung back through the pressure plate 134 into the message chute (compare Figs. 12 and 11). At the same time, the pins 133 on plate 128 release the hinged side gates 76 to closed position.

Just as the shaft 99 completes its revolution, the switch arm 123 (Fig. 37) drops into the recess 121 of cam 119, whereupon the sealing motor 90 stops. Because of the pawl and ratchet clutch 104—106 (Fig. 32), the over-run of the sealing motor shaft 99 will not affect the position of the spring connected plates 128 and 134, which must be correctly placed at the exact top of the stroke. The machine is now in condition to receive the next message.

The particular apparatus shown and described herein represents a practical embodiment of our invention as actually built for commercial operation. It will be understood that in the broader view of our invention various changes and modifications may be resorted to in producing a machine with the novel features set forth in the appended claims.

For convenience we have used the engineer's term "blank" in the description and claims to mean a message-bearing sheet of paper or paper-like material suitable for the purpose. Further, by the term "message" we do not necessarily mean a text of words but include any kind of intelligence recorded on the blank. It is hardly necessary to add that such expressions as downward, upward, vertical, horizontal, forward, rearward and others indicating position or direction of movement, are used merely in a relative sense for purposes of description and not by way of limitation.

We claim as our invention:

1. An automatic message sealing machine comprising means for folding a paper blank so as to conceal the message thereon, means for piercing holes in the folded blank and extruding the paper around the holes to form rims of double thickness, means for compressing said extruded rims to form integral paper rivets adapted to seal the folded blank which conceals the message thereon, and driving connections for operating said folding means, piercing means and riveting means in automatic sequence.

2. An automatic message sealing machine comprising means for folding a paper blank to conceal the message thereon, means for piercing holes in the folded portion of the blank and forming extruded paper rims around the holes, and means for crimping the extruded rims against the paper to form integral rivets which seal the folded blank, whereby the sealed message can be opened only by tearing the rivets.

3. An automatic message sealing machine comprising means for folding a paper blank into open U-formation, means for compressing the U-shaped blank into a closed fold, a set of punches for piercing the compressed fold of the blank, said punches extruding the rims of the pierced holes, and means for crimping the extruded rims against the paper to form integral rivets which seal the folded blank, whereby the sealed blank can be opened only by tearing the rivets.

4. An automatic message sealing machine comprising means for folding a paper blank to conceal a message thereon, mechanism for punching holes in the folded blank, mechanism for compressing the paper rims that protrude around the punched holes to form rivets integral with the paper, spring actuated means for causing said compressing mechanism to operate with a hammer blow against the paper rims, power means for retracting said compressing mechanism and means for operating said punch mechanism and releasing said compressing mechanism in automatic sequence.

5. An automatic message sealing machine comprising means for folding a paper blank to conceal a message thereon, mechanism for punching holes in the folded blank, mechanism for compressing the paper rims that protrude around the punched holes to form rivets integral with the paper, a motor driven shaft for operating said punching mechanism, spring actuated means for operating said compressing mechanism, cams on said shaft for retracting said spring actuating means to condition said mechanism to operate with a hammer blow against the paper rims when released, and connections whereby said shaft operates said punch mechanism and releases said compressing mechanism in automatic sequence.

6. An automatic message sealing machine having a fixed vertical plate, means for folding a message sheet upon itself to form a folded blank, means for holding the folded blank compressed against said plate, punching mechanism mounted in front of said plate, means for operating said punching mechanism to pierce holes in the compressed folded blank, the pierced paper forming extruded rims around the holes, riveting mechanism mounted behind said plate, spring means to operate said riveting mechanism to crimp the extruded rims against the paper, said crimped rims forming integral paper rivets which seal the folded blank, and means for releasing the sealed blank from said plate.

7. An automatic message sealing machine having means providing a chute for receiving a message blank to be sealed, means for feeding the deposited blank into the chute a predetermined distance, retractable curved fingers mounted at the bottom of said chute and adapted to bend the moving blank into a U-fold which covers the message on the blank, a plate movable against said fold to compress it, means for punching holes in the folded blank, means for automatically retracting said fingers to clear the way for the operation of said pressure plate and punching means, mechanism for compressing the paper around the punched holes into sealed rivets, and means for automatically releasing the sealed blank from the chute.

8. An automatic message sealing machine comprising a fixed plate which has a plurality of dies properly spaced, means for folding a message sheet upon itself to form a folded blank, means for holding the folded paper blank pressed against said plate, the folded portion of the blank being positioned opposite the dies, a plurality of piercing punches arranged on one side of said plate, a corresponding plurality of riveting punches arranged on the other side of said plate, said piercing punches and riveting punches being mounted in register with said dies, means for passing said piercing punches through the folded blank into the dies, whereby the holes pierced in the folded blank are surrounded each by a rim of extruded paper, and cam controlled spring mechanism for operating said riveting punches to enter the dies and compress said extruded rims which form integral paper rivets adapted to seal the folded blank.

9. An automatic message sealing machine comprising a fixed plate which has a plurality of dies properly spaced, means for folding a message sheet upon itself to form a folded blank, means for holding the folded paper blank pressed against said plate, the folded portion of the blank being positioned opposite the dies, a plurality of piercing punches arranged on one side of said plate, a corresponding plurality of riveting punches arranged on the other side of said plate, said piercing punches and riveting punches being mounted in register with said dies, means for passing said piercing punches through the folded blank into the dies, whereby the holes pierced in the folded blank are surrounded each by a rim of extruded paper, and cam controlled spring mechanism for operating said riveted punches with a sudden movement to enter said dies and strike the extruded paper rims a sharp blow which compresses the rims to form integral paper rivets capable of sealing the folded blank.

10. An automatic message sealing machine comprising a fixed plate which has a plurality of dies properly spaced, means for folding a message sheet upon itself to form a folded blank, means for holding the folded paper blank pressed against said plate, the folded portion of the blank being positioned opposite the dies, a plurality of piercing punches arranged on one side of said plate, a corresponding plurality of riveting punches arranged on the other side of said plate, said piercing punches and riveting punches being mounted in register with said dies, spring means for actuating said riveting punches forward with a sudden movement, a motor driven shaft, connections whereby said shaft operates said riveting punches to pass through the folded blank into the dies, whereby the holes pierced in the folded blank are surrounded each by a rim of extruded paper, a plurality of cams on said shaft arranged to place said spring means under tension and release the riveting punches at a predetermined moment to strike said rims a sharp blow which compresses the rims to form integral paper rivets capable of sealing the folded blank, and means for releasing the sealed blank.

11. An automatic message sealing machine having a fixed plate, a pressure plate slidably mounted in parallel relation to said fixed plate, said plates being normally spaced to provide a chute for receiving a paper blank in flat condition, means for feeding the deposited blank a predetermined distance into the chute, means at the bottom of said chute for automatically folding the leading portion of the blank against the pressure plate, whereby the blank is shaped into open U-formation, mechanism for moving the pressure plate against the fixed plate to compress the U-shaped blank into a closed fold which conceals the message thereon, apparatus for producing integral paper rivets on one side of the compressed blank to seal the same in folded condition, and means for releasing the sealed blank from the chute.

12. An automatic message sealing machine having a fixed vertical plate, a second plate slidably mounted in front of said fixed plate, means for folding an inserted blank between said plates into open U-formation, a third plate slidably mounted in front of the second plate to push the latter rearward and compress the U-shaped blank into a closed fold which is tightly held between the fixed plate and the second plate, a set of piercing punches carried by said third plate to pierce holes in the compressed fold of the blank, the pierced paper forming extruded rims around the holes, a set of riveting punches mounted behind said fixed plate in register with the piercing punches, timed means for operating said riveting punches to crimp the extruded rims against the paper and thereby form integral rivets which seal the folded blank, and means for releasing the sealed blank from between the first and second plates.

13. An automatic message sealing machine having a pair of shafts mounted for independent operation, a motor for operating the first shaft, a second motor for operating the second shaft, means forming a chute for receiving a message blank to be sealed, means operated by the first shaft to feed the deposited blank into the chute a predetermined distance, means for automatically folding the blank into open U-shape as it is being fed into the chute, mechanism operated by the second shaft to compress the U-shaped blank and pierce a plurality of holes in the compressed folded portion of the blank, the pierced paper being extruded around the rims of the holes, other mechanism operated by the second shaft to form the extruded rims into integral paper rivets adapted to seal the folded blank, and electric means controlled by the first shaft for automatically stopping the first motor at the end of a paper feed cycle and energizing the second motor to start the piercing and riveting mechanisms in timed sequence.

14. In an automatic message sealing machine having a chute for the deposit of a message blank, mechanism for feeding a deposited blank into the chute comprising a fixed support, a post slidably and tiltably mounted on said support, a cross shaft carried by said post, a gear at one end of said shaft and a paper feed wheel at the other end of said shaft, a contractile spring connected to said post and tending constantly to pull it in one direction, a rotary cam arranged to engage said post, said cam having one edge for moving the post in the opposite direction and causing said spring to hold the post in tilted position where the feed wheel remains operative, said cam having another edge for actuating the spring to move the post into position where the feed wheel engages the deposited blank in traction contact, driving connections for operating said gear a predetermined amount to feed the blank into the chute a prescribed distance, means for automatically reversing the direction of the leading edge of the blank as it is fed into the chute, whereby the blank is formed into an open fold for the purposes set and apparatus for producing integral paper rivets on one side of the folded blank to seal the same in folded condition.

15. An automatic message sealing machine having a fixed plate which forms one wall of a chute for receiving a paper blank to be sealed, means for feeding a deposited blank a prescribed distance into the chute, means arranged at the bottom of the chute for automatically curving the moving sheet into an open fold, a rotary shaft mounted behind said plate parallel thereto, means for giving said shaft one revolution during each sealing operation of the machine, reciprocable mechanism in front of said plate for compressing the folded portion of the blank against the fixed plate and punching a series of holes in the compressed fold which conceals the message on the blank, the punched holes being surrounded by extruded rims, reciprocable riveting mechanism mounted behind said plate for compressing the extruded rims to form integral paper rivets which seal the folded blank, driving connections between said shaft and said first mechanism, whereby the latter is moved forward to fold and pierce the blank during the first half revolution of said shaft and is moved back to normal position during the second half revolution of the shaft, means carried by said shaft for causing said riveting mechanism to operate at a predetermined moment during the first half revolution of said shaft and for retracting said riveting mechanism during the second half revolution of the shaft, and means for automatically stopping said shaft upon the completion of one revolution.

16. An automatic message sealing machine having a fixed plate provided with spaced dies, a second plate slidably mounted in front of said fixed plate in parallel relation thereto, said plates being normally spaced to form a chute for receiving a deposited message blank, curved fingers at the bottom of said chute, mechanism for feeding the deposited blank a predetermined distance into the chute and over said curved fingers which automatically fold the leading portion of the blank against the second plate into open U-formation, a third plate slidably mounted and carrying a set of piercing punches arranged in register with said dies on the fixed plate, connections between the second and third plates whereby the forward movement of the third plate pushes the second plate against the fixed die plate to compress the U-shaped blank into a closed fold which covers the message, a motor driven shaft operatively connected to said third plate for moving the latter forward and back at prescribed intervals, said punches cooperating with the dies to pierce the compressed fold of the blank during the forward movement of said plate, the pierced paper forming an extruded rim around each hole, a set of spring pressed riveting punches mounted behind the fixed die plate in register with the dies, and means on said shaft for releasing said riveting punches at a predetermined moment to strike a sharp blow against said extruded rims which are thereby compressed to form integral paper rivets capable of sealing the folded sheet.

References Cited in the file of this patent

UNITED STATES PATENTS

| Number | Name | Date |
|---|---|---|
| 377,051 | Saxe et al. | Jan. 31, 1888 |
| 689,394 | Gregory | Dec. 24, 1901 |
| 1,387,164 | Nassano | Aug. 9, 1921 |
| 1,678,917 | Roush | July 31, 1928 |
| 1,719,480 | Linden | July 2, 1929 |
| 1,787,817 | Egenolf | Jan. 6, 1931 |
| 1,849,711 | Glasner et al. | Mar. 15, 1932 |
| 2,274,488 | Kutscher | Feb. 24, 1942 |
| 2,333,966 | Weiss | Nov. 9, 1943 |
| 2,395,804 | De Gruchy | Mar. 6, 1946 |

FOREIGN PATENTS

| Number | Country | Date |
|---|---|---|
| 513,641 | Great Britain | Oct. 18, 1939 |